United States Patent [19]

Hopner et al.

[11] Patent Number: 5,150,357
[45] Date of Patent: Sep. 22, 1992

[54] INTEGRATED COMMUNICATIONS SYSTEM

[76] Inventors: Emil Hopner, 211 Prospect Ave., Los Gatos, Calif. 95030; John R. Featherston, 64 Central Ave., Los Gatos, Calif. 95032; Michael A. Patten, 7454 Tulare Hill Rd., San Jose, Calif. 95139

[21] Appl. No.: 365,175

[22] Filed: Jun. 12, 1989

[51] Int. Cl.$^5$ ............................................. H04Q 11/04
[52] U.S. Cl. ................................. 370/68.1; 370/58.3; 370/110.1
[58] Field of Search ............... 370/65.5, 53, 54, 58.3, 370/68.1, 110.1

[56] References Cited

U.S. PATENT DOCUMENTS

| | | | |
|---|---|---|---|
| 3,860,761 | 1/1975 | O'Neill, Jr. | 370/54 |
| 4,173,713 | 11/1979 | Giesken et al. | 570/54 |
| 4,201,891 | 5/1980 | Lawrence et al. | 370/58.3 |
| 4,317,962 | 3/1982 | Cox et al. | 370/58.3 |
| 4,771,419 | 9/1988 | Graves | 370/58.3 |

Primary Examiner—Douglas W. Olms
Assistant Examiner—Christopher O. Edwards
Attorney, Agent, or Firm—Davis & Schroeder

[57] ABSTRACT

Information pathways for communications among personnel, among computers, and between personnel and computers, in a local communication system, including remote communications via leased lines or the public network is described. To a public central office, the present invention appears as a private branch exchange (PBX), served by many trunks, WATS, and "Foreign Exchange" lines, and providing all the standard PBX services; to the remote leased facility, it appears as a standard tie line terminator or, if the remote is another ICS, as a logical tie line terminator for which several logical tie lines are combined into each leased T1 line; to the in-house computer, it provides switched connection to other computers or to terminals at up to 19,200 Baud modulated data, at 32K-Baud for native (internal system) data (including 2K-Baud of forward error correction), or up to several gigabits direct binary transmission (such as the transmission scheme used with NDS and ANR displays, etc.); to the in-house human user, it appears as a unique electronic telephone which offers many special services to facilitate his communications with other people and with computers. Advanced features such as optional hands-off voice on/off hook control, personal identification by voice print and remote chart presentation are provided.

10 Claims, 22 Drawing Sheets

INTEGRATED COMMUNICATIONS SYSTEM

BACKGROUND OF THE INVENTION

The present invention relates to the field of communications, which is slow-growing, very competitive and essentially mature. For purposes of this specification, communications shall refer to multi-media transmission of information from one or more nodes to one or more other nodes. In particular, this invention relates to a system for transmitting voice, image, text and data from one computer to another, where either or both of the computers can be or include an ordinary household telephone.

A. Switching

At the heart of any modern communications system is switching. The architecture of the first automatic switching system has some basic characteristics, having long range implications. The first step-by-step switching system (i.e., rotary switching system) actually establishes the desired connection between nodes by remote control from a telephone dial. Such a system is said a self-connecting, distributed control system. In the beginning, it was electromechanical by nature and therefore difficult to maintain. In addition, the remote control of relays employed by the system generated impulse noise at the telephone exchanges, which became the main source of noise which in turn caused errors in received computer data when transmitted over telephone lines.

In a crossbar switching system, the rotary switches of the step-by-step switching system were replaced with matrix switches, which were easier to maintain and produced less noise (Electromagnetic Interference or EMI) when used for data transmission. The address of the called party, generated by the telephone dial, was stored in a register and processed through relay logic for making connection via the matrix switch. Later, the crossbar switch was replaced by Reed relays. Later still, the relay logic was implemented electronically, which resulted in the electronic switching system (ESS). ESS is fast, noise-free and easy to maintain.

Step-by-step, crossbar and ESS switching systems are known as "space division switching". Time division switching systems are an outgrowth of digital transmission technologies Such switching systems allocate time slots to users for the duration of a connection. All users are physically connected to the same communication line, but have time slots allocated for the duration of the call. Such a switching system is economically attractive and, partly because it uses substantially less wiring, is easy to maintain. However, the bandwidth of time division switching systems must be divided among all the simultaneous users connected to the line. Thus, in spite of high-speed technology available today, the bandwidth or, alternatively, digital speed for each user, is limited to 64K bits/sec.

Time division switching is a natural outgrowth in the evolution of switching systems. For telephony, it provides quality and security at reasonable cost. User-oriented functions can be provided with the elegance and flexibility of computer-controlled switching systems For computer users, data can be transmitted at 64K bits/sec on a switched bases, and facsimile systems can be faster and more powerful.

With the advent of digital trunk carrier systems and digital switching, it quickly became clear that communication networks would evolve toward a capability to provide end-to-end digital connections. Much effort has been expended, worldwide, to define a set of realizable standards for what is called an Integrated Services Digital Network (ISDN). The ISDN concept permits endusers to transmit up to a total of 144K bits/sec of information consisting of two 64K bit/sec channels, which can support circuit or packet switching, and a third 16K bit/sec packet-switched channel which makes use of existing two wire loop systems in most cases. The 16K bit/sec packet switching channel has a well defined protocol and is used for both signalling between endusers and the central office switch, and for user-to-user packet information.

ISDN will provide digital voice and data services far superior to anything available today. From a computer communications point of view, ISDN is very attractive, since it provides 64K bits/sec switched service without a modem. While facsimile services are greatly improved, they can, at best, provide only 16K bits/sec over analog voice networks on a worldwide basis. Furthermore, when the potential capability of optical fibers is considered, together with its ultimate availability to every telephone user at a cost roughly equivalent to copper transmission lines, the capabilities of the ISDN switching pales in comparison with the gigabit transmission capabilities of fiber optic transmission.

Therefore, a high speed digital switching system capable of providing fast access to data for high and low speed computer terminals, access to image files and facilitating communications for all kinds of compatible and incompatible computer systems at a cost of switching affordable for digital voice communication is desirable. Even more desirable is such a system which is compatible with and transparent to ISDN facilities and end users, but which anticipates conversion of national and worldwide telecommunications networks from two wire, copper linkages to optical fibers and ultra-fast switching systems.

An historical review of the prior art of telecommunications in the United States is given in "Communications and Switching" by Stewart D. Personick and William O. Flechenstein, Proceedings of the IEEE, Vol. 75, No. 10, October, 1987. In addition, ISDN is more fully described and discussed in IEEE Communications Magazine, Vol. 25. No. 12, December, 1987.

B. Telephony

In the 1930's, basic standards for toll quality telephony were established. That basic standard comprised the minimum bandwidth needed to assure recognition of the speaker by the receiver at the other end of the link, together with at least 98% understandability of the speech in context. The minimum bandwidth was 300 Hz to 3400 Hz, which resulted in 4 kHz frequency spacing for single sideband (SSB) cable and radio transmission. These standards have been preserved in digital transmission, using pulse code modulation (PCM), and are perpetuated in ISDN standards.

Toll quality telephone sounds astonishingly good in spite of the relatively narrow (approximately 3 kHz) bandwidth, where modern transducer technologies, such as the electret microphone and dynamic earphone, are used in the user's handset. Such a telephone link transmits all the vowels very well. However, transmission of consonants, which have main speech energies concentrated between 7 kHz to 8 kHz, is rudimentary at best. Generally, speech taken in context provides sufficient clues for good understandability, although, unexpected words and names typically must be spelled in order to circumvent the lack of bandwidth in toll quality telephone connections. Thus, in general, telephone networks having a high-fidelity link at a cost equal to or less than the user pays today is, at least, desirable.

According to information theory when PCM was discovered, the sampling rate of an analog signal was set at 2 W for perfect recovery of signals having a bandwidth of less than W. In order to prevent foldover intermodulation distortion, the speech spectrum had to be strictly limited to less than 4 kHz. Thus, the sampling rate for voice telecommunications was set at 8K samples/sec, and a prior art encoder, utilizing an advanced Adaptive Differential PCM (ADPCM) module for digitizing analog voice signals at that rate, is shown in FIG. 1.

In order to strictly limit the speech spectrum to 4 kHz, a sharp, low pass filter was required as also shown in FIG. 1. In addition, digital encoding of speech was very costly and could be economically justified only for Time Division Multiplexing (TDM) transmission systems. While single chip encoders are now available on the market which make digital telephones economically feasible, the sharp low pass filter required for classical PCM encoders requires about half the semiconductor "real estate" of a typical coder/decoder (codec) chip.

C. Telephone Graphics

The inability to draw simple pictures remotely is a severe limitation of present-day telephony. Even with a hi-fi telephone, the ability to communicate is still hampered by the absence of graphics capability. The first serious attempt to provide remote telephone graphics was the "Picture Phone", introduced by Bell Laboratories. While the Picture Phone was a technical success, the failure in the marketplace is easily attributed to its cost and inability to satisfy a well-defined need. More simply stated, the market requirements were not properly defined before the Picture Phone was developed. However, even today, there are other similar attempts at transmitting video over presently installed telephone lines. See, for example, the VisiTec Visual Telephone Display, manufactured by Mitsubishi.

The ability to remotely present graphics, including charts, in real time while the telephone conversation is in progress and at a reasonable cost is extremely desirable Definition of telephone graphics is virtually at the same level of development that definition of basic standards for toll quality telephony was in the 1930's. Once defined, this new video service can be expanded to higher resolution, including gray scale, color and motion as required Thus, development of a standard for telephone graphics, preferably based on presently available technology but which anticipates technology advances, is desirable.

D. System Considerations

The computer user communications traffic may appear to be profoundly different from telephone voice traffic requirements. For example, the computer terminal user typically establishes connection to a computer port at the beginning of the day and maintains the connection for some hours until he goes home. Therefore, 100% connectivity or usage of the switching systems is indicated. On the other hand, telephone user statistics indicate that the average telephone call is about 10 minutes long, and that only about 10% of all users need simultaneous connections at the same time.

A closer look at the actual information traffic indicates that data is transmitted between the terminal and the computer system occur less than 10% of the time the linkage is established. However, when the data is generated, it should be transmitted very quickly. The desired data transmission rates are in the megabits/sec range and the desired connection times are less than a microsecond. Thus, the use of a telecommunications system by a computer terminal user is actually much more like the use of the same system by a telephone user than has been appreciated by telecommunications systems designers in the past.

Even if a switch controller, designed and constructed in accordance with ISDN specifications, is built in high speed technology, and interfaces were designed to accommodate both the computer terminal user (text and data) and the telephone (voice and image information), at least 10,000 programming steps are required before a single connection is actually made. Moreover, even if the system operated at 10,000,000 instructions/sec (10 MIPS), the connect time still will be in the 1 millisecond range. While millisecond connect times are much faster than any presently known voice switching system, it is inadequate to accommodate the nanosecond switching requirements of high speed systems which will be available in the foreseeable future, perhaps in accordance with the present invention.

SUMMARY OF THE INVENTION

A. Switching

The integrated communications system of the present invention provides a switching subsystem configuration for use at a local exchange level. The system is also expandable and adaptable for regional, nationwide and worldwide use.

The switching subsystem of the present invention, hereafter BNX (Brand New Exchange), establishes digital connections between users. The established link is not actually a mechanical connection as in step-by-step switching systems, but rather comprise semiconductor switching stages at which binary signals are regenerated in an asynchronous manner. The BNX provides a transparent link, the speed of which is limited only by the technology in which it is implemented. Therefore, gigabit transmission rates of digitized information are achievable in present day gallium arsenide or other high speed semiconductor chip technologies.

To establish a connection, a binary address is transmitted to the port of the exchange from the terminal. For purposes of this specification, the term "terminal" may refer to either a computer terminal or a telephone instrument. The exchange port searches for the first free address register in the exchange, which in turn stores the address and controls the switching logic of the first stage of switching. By executing the first part of the address, the second stage of switching is reached. The process continues until the called end user is reached. Following the basic architecture of classical step-by-step switching, an acknowledgement of the established link is then returned to the caller end user of the connection to confirm that the link is ready for transmission. The speed of establishing the link is determined by switching delays encountered in the technology used. Nanosecond connect times are readily achievable with present state-of-the-art technologies, even where 10 or more switching stages are required.

The BNX of the present invention provides compatibility between terminals at each end of the link and the external installed switching and transmission facilities. Compatibility is provided by a trunk interface port, a function commonly provided by present-day private branch exchanges (PBX).

A transparent digital switch, the BNX is designed for 10% connectivity. When presented with an address, it establishes connection links in less than a microsecond. All computer ports are connected to a data exchange controller which handles computer communications traffic A telephone call processor handles voice traffic. The trunk interface units provide compatibility of internal high-fidelity telephone links with the existing public telecommunications network. The ISDN interface port provides for compatibility with ISDN features of the existing public telecommunications network as they become available.

Since a terminal designed according to the principles of the present invention and described elsewhere in this specification is transparent to compatible or incompatible computer systems, it does not require changes in programming or hardware except at the actual physical connectors thereto. Thus, a local exchange, in for example, a private or corporate integrated communications system, preserves the integrity of all the advanced features provided by the system of the present invention, but is compatible with the existing public telecommunications network.

Ultimately, local telephone companies will be able to provide direct interconnections among user terminals of the present invention by adapting the BNX technology of the present invention. BNX technology in turn can provide interconnection and compatibility with existing international telecommunication networks.

It should be noted that the signalling, i.e. control signal, paths of the switching subsystem of the present invention may also be usable as the transmission path for communication signals, i.e. both data and voice. In such a configuration, the number of transmission lines, i.e. links required, for a given communication is substantially reduced or conversely, the capacity of a system of similar complexity is substantially increased.

B. Telephony

A telephone instrument constructed according to the present invention, hereafter BNT (Brand New Telephone), or user instrument, contains not only the codec but also encryption capability and the processing power to provide many user-oriented functions currently provided by centralized call processing. The complex programming required for centralized call processing (at the PBX or central exchange) is largely eliminated, except for such functions which are more economically accomplished centrally, such as voice mail and long distance routing. However, the user instrument of the present invention can provide such user-oriented functions as automatic registration of all incoming calls with display of the name of the calling party and an indication of the urgency of the call, while a call is still in progress. In addition, the BNT of the present invention can provide such features as personal identification through passwords (voice print), speakerphone capabilities and efficient high-fidelity speech encoding.

Using ADPCM for high-fidelity speech encoding, the user instrument of the present invention samples the voice signal at the rate of 10K samples/sec and produces 3 bits/sample, or 30K information bits/sec, together with volume compression and expansion, to provide high-fidelity speech encoding without noticeable quantization noise or foldover distortion. No input filter is required and commensurate savings in semiconductor chip real estate is realized.

In PCM systems, noise becomes noticeable when error rates reach approximately one error in $10^5$ bits. However, delta modulation schemes are known to be considerably less sensitive to noise, which becomes audible in such systems at error rates down to one error in $10^2$ bits. Therefore, 2K bits/sec is added to the ADPCM bitstream for forward error correction to make the noise sensitivity of the proposed codec in the user instrument at least as good or better than delta modulation. Such noise immunity will be especially important for satellite communications and low cost digital microwave systems because of microwave power limitations.

The proposed ADPCM system converts analog information signals into 32K bits/sec digital information signals which comprise 30K bits/sec for information plus 2K bits/sec for error correction. Since the sampling rate is at 10K Hz and input filtering is eliminated, the audio signal produced by the user instrument of the present invention provides substantial improvement in the quality of voice signals, and should be at least as good or better than standard PCM for data transmission with modems. Every voice line has direct access to 32K bits/sec lines. Modems can be used to achieve compatibility with the installed base where necessary.

The audio signal produced by the user instrument of the present invention also provides unexpected improvement in understandability of voice communications over present day voice communication equipment. A good quality microphone is used in conjunction with a sampling rate of 10 kHz (instead of the standard 8 kHz rate), and input filtering is eliminated. Foldover distortion is absent because the natural frequency spectrum of vowel sounds falls below 5 kHz. The fricatives are noise-like signals for which intermodulation distortion will create more noise-like signals, which are indistinguishable to the human ear from the desired original voice sounds The sound quality to the receiver's ear is of high fidelity, indistinguishable from hi-fi voice.

Since there is no need for an input low pass filter, the space typically required for such filters on semiconductor chips can be used for providing an encryption function. Thus, encryption may be provided at no additional cost, together with high-fidelity reproduction of voice signals within the BNT.

C. Telephone Graphics

Telephone graphics may be incorporated into the user instrument of the present invention, utilizing present day technology for use with the telephony and switching subsystems of the proposed system. Initially, a 525-line TV scanner can provide basic information for black and white viewing of charts and drawings. A typical presentation chart is usually prepared for large audiences and therefore must be legible at reasonable distances. Such charts can be adapted for standard TV scanning and reproduction.

Typically, the original image of such a chart can be captured in a total of 275K bits of sampled information. Applying a 10-to-1 compression, easily achievable with coarse information (charts and simple drawings), less than 30K bits are needed for transmission of a still image to a remote location in less than a second over a 32K bits/sec link. A single Very Large Scale Integrated (VLSI) chip is required to compress and expand a single frame of such video information, and provide sufficient storage for a compressed image refresh buffer.

Thus, a complete telephone graphic system would consist of a TV camera and display, coupled to or incorporated as part of the user instrument of the present invention. The integrated circuits provide real time remote viewing of charts and drawings, all at minimal additional cost to the user.

D. Systems Considerations

Since the analog-to-digital (A/D) conversion, error control and encryption is provided in the user terminal of the present invention, speech information also may be packetized at the terminal. Signalling between the local exchange and the user terminal can be accomplished during the silences which naturally occur in any voice communication. In addition to enhancing efficiency, this capability also provides the user with the convenience of receiving messages while the conversation is in progress. Signalling compatibility with ISDN and other modes of operations is provided at the trunk end of the local exchange.

With the addition of an alpha numeric keyboard and related conversion logic, the user instrument of the present invention can become a data terminal Thus, the occasional or casual user of a personal computer (PC), who cannot otherwise justify the cost of purchasing such a system, can use the data terminal features of his user instrument to access a shared PC. With the addition of a low cost printer, electronic mail and other services can be accessible to every telephone user at affordable cost.

Broadband analog facilities can be converted into digital links at 32K bits/sec per analog voice channel by the present invention. Since the user instrument requires only 32K bits/sec and has powerful error correction, high-fidelity digital voice signals are provided at capacities equal to or better than analog single sideband (SSB) facilities. The packetized speech capability of the user terminal of this invention can double the capacity of analog facilities using digital interpolation of speech packets and silences.

The proposed ADPCM system offers twice the transmission capacity as compared to the CCITT standard PCM system, with approximately half the complexity of implementation. Noise resistance is considerably improved and speech quality is dramatically enhanced. Digital interpolation of speech offers another factor of two improvement, resulting in a total factor of four improvement as compared with ISDN performance.

It shall be noted that the performance of ISDN is limited by the inherent design limitations of TDM transmission, which means that capacity is divided by the number of users. The integrated communications system of the present invention is based on space division multiplex transmission with distributed control, which means that capacity is not divided by the number of users, and the only limitation on capacity is the speed of switching component technology.

DESCRIPTION OF THE PREFERRED EMBODIMENT

Figure 1:
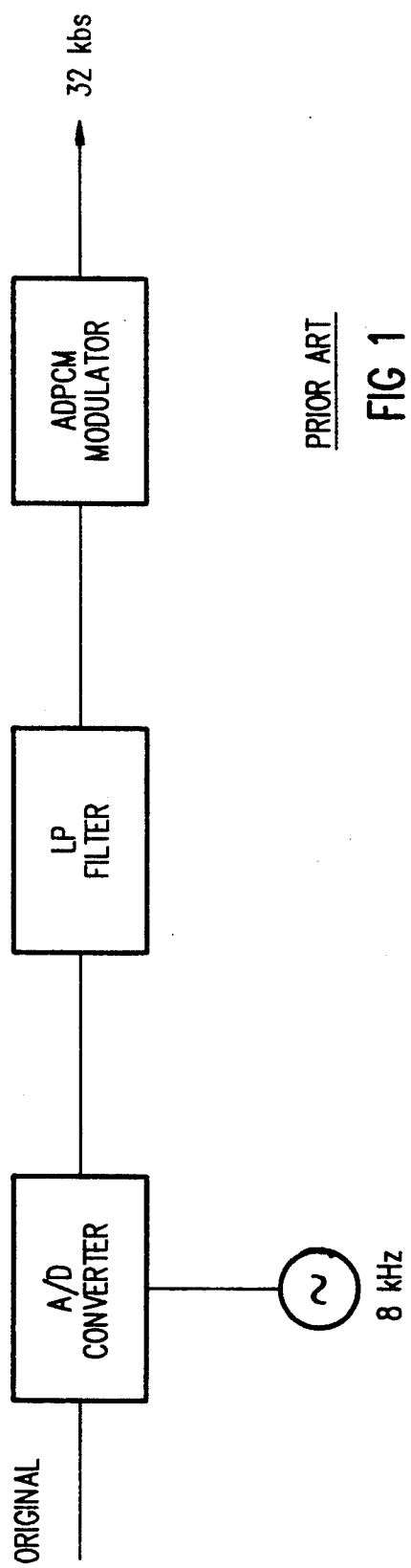
FIG. 1 is a block diagram of an ADPCM speech encoder according to the prior art.
Figure 2A:
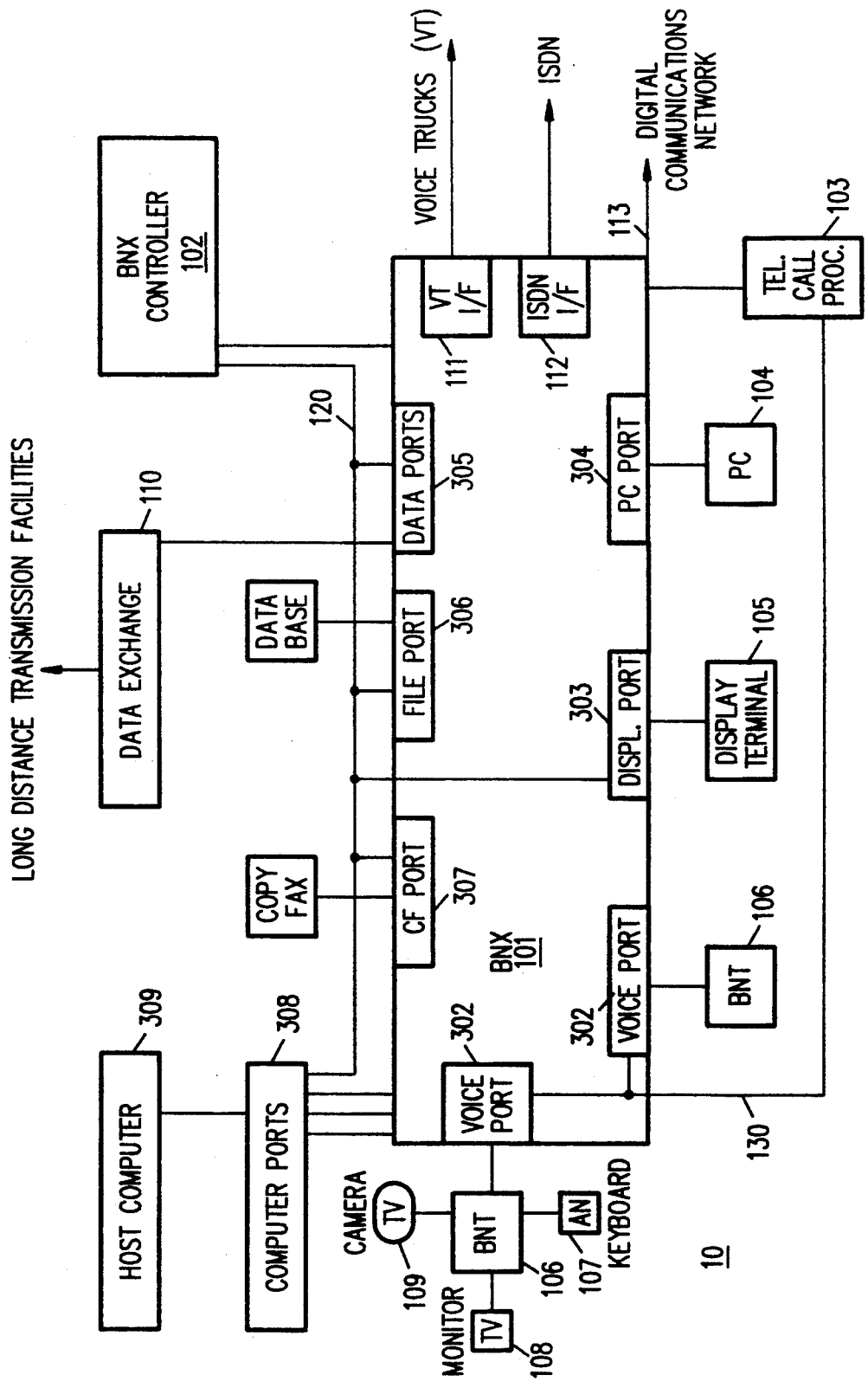
FIG. 2A is a block diagram of an integrated communications system constructed according to the principles of the present invention.

An integrated communications system 10, constructed in accordance with the present invention, is shown in FIG. 2A. The system includes a transparent, high-speed, fast-connect progressive switch 101 to which is connected BNX controller 102, telephone call processor 103, personal computer 104, display terminal 105, user instruments 106, computer ports 303, copy fax 108, data base controller 109 and data exchange controller 110. Progressive switch 101 incorporates a plurality of ports 302 to 307 inclusive (hereafter also "switch ports") to which a number of the peripheral devices are coupled. Such ports are device-specific adaptors which provide compatibility between switch 101 and the particular device or controller coupled thereto In addition, progressive switch 101 incorporates voice trunk interface 111 and ISDN interface 112 which similarly provide system compatibility between switch 101 and the public switched telephone network and ISDN, respectively. Finally, output 113 of switch 101 provides switched, all-digital signalling and communication signals, conditioned for an all-digital communication network when available.

A. Switching Architecture

Figure 3A:
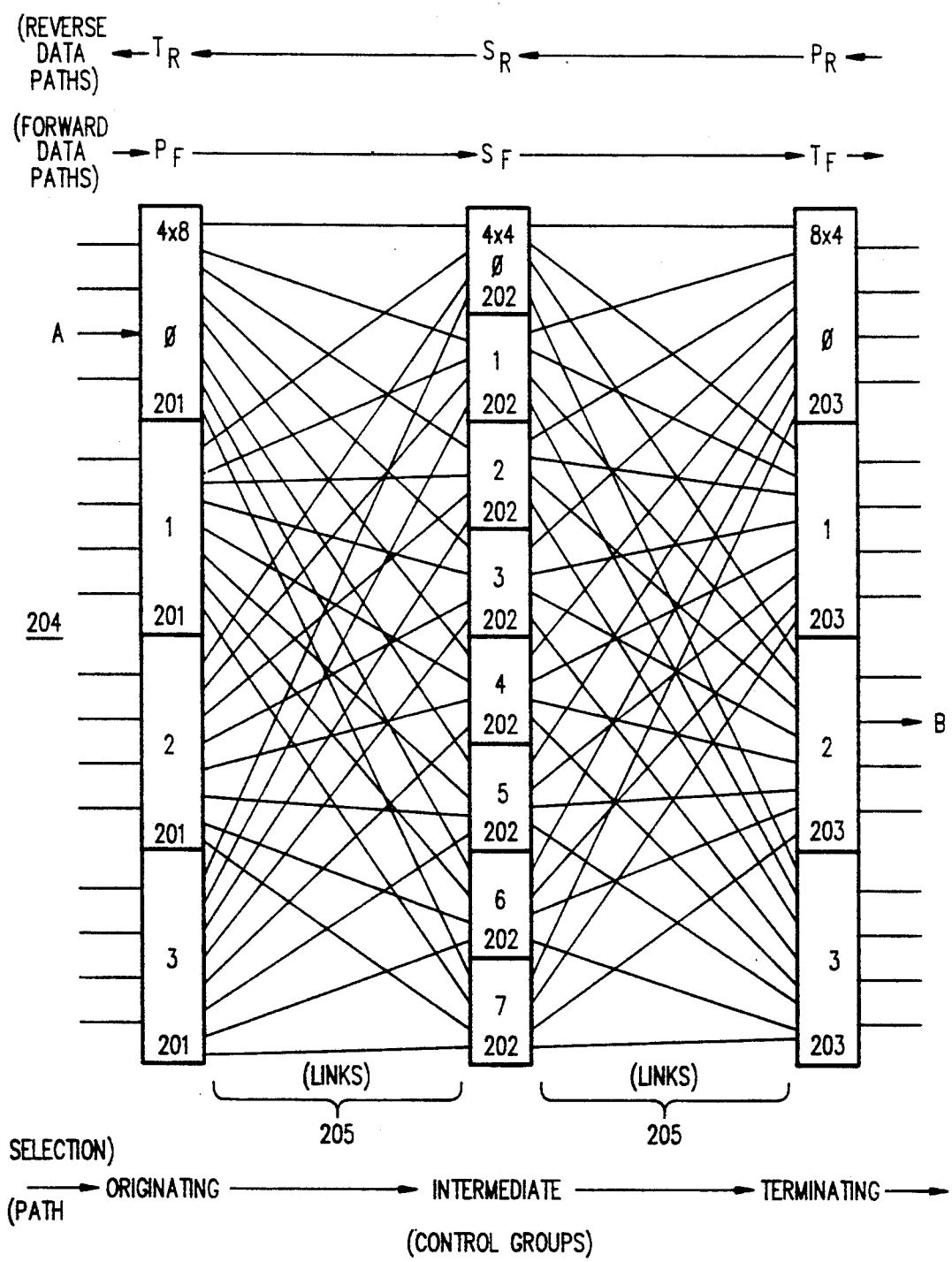
FIG. 3A is a block diagram one plane of a distributed switch used in the system of FIG. 2A.

Referring to FIG. 3A, progressive switch 101 is a 16×16 matrix of four 4×8 matrices 201 which are each connected by one link to each of eight 4×4 matrices 202 each of which is connected to four 8×4 matrices 203. This interconnection of matrices with links is referred to as switch plane 204. Matrices 201 are also referred to as primaries, 4 by 4 matrices 202 are secondaries and 8 by 4 matrices 203 are tertiaries and make up primary (P), secondary (S) and tertiary (T) stages of switching respectively. Thus, switch plane 204 comprises three stages of switching.

One embodiment of the present invention incorporates four switch planes 204. Two planes carry information left to right and are referred to as forward switch planes, and two carry information right to left and are referred to as reverse switch planes. In the forward planes, one is dedicated to carrying information necessary for switch operation and the other is reserved exclusively for user information. The same holds true for the reverse planes. In both cases, the planes reserved for user information are referred to as data planes. The planes that carry information for switch operation are referred to as control planes.

Functionally, the plane are arranged vertically, that is each matrix depicted in FIG. 3A has three more matrices beneath it. The forward planes are arranged left to right with P, S and T stages, the reverse planes are arranged from left to right with T, S and P stages. Thus, if switch plane 204 represents the forward control plane, forward control primary 0 matrix would have beneath it reverse control tertiary 0, forward data primary 0 and reverse data tertiary 0 matrices. In other words, the four planes reside vertically with forward and reverse planes being a left-right mirror image of each.

Each stack of four matrices 201, 202 and 203 is referred to as a group. The P, S and T designations for matrices cannot be applied to groups, since the right most and left most groups are composed of both P and T matrices. Since the groups were formed for functional reasons, and since connections originate on the left and terminate on the right of the switch, the groups are referred to as originating groups 0-3, intermediate groups 0-7 and terminating groups 0—3, left to right.

To make a connection through the switch from A to B in FIG. 3A, originating group 0 must set up a path through each of its four matrices from A to an intermediate group, for example 3. Intermediate group 3 must in turn set up a connection in each of its four matrices from originating group 0 to terminating group 2. In turn, terminating group 2 completes the connection to B.

In a sense, each group of matrices operates as a number of four pole switches with connections in each plane progressing in parallel from left to right Even though connections progress from left to right, it must be remembered that a connection consists of two sets of bidirectional information paths, one set for user data, the other for switch control.

Figure 3B:
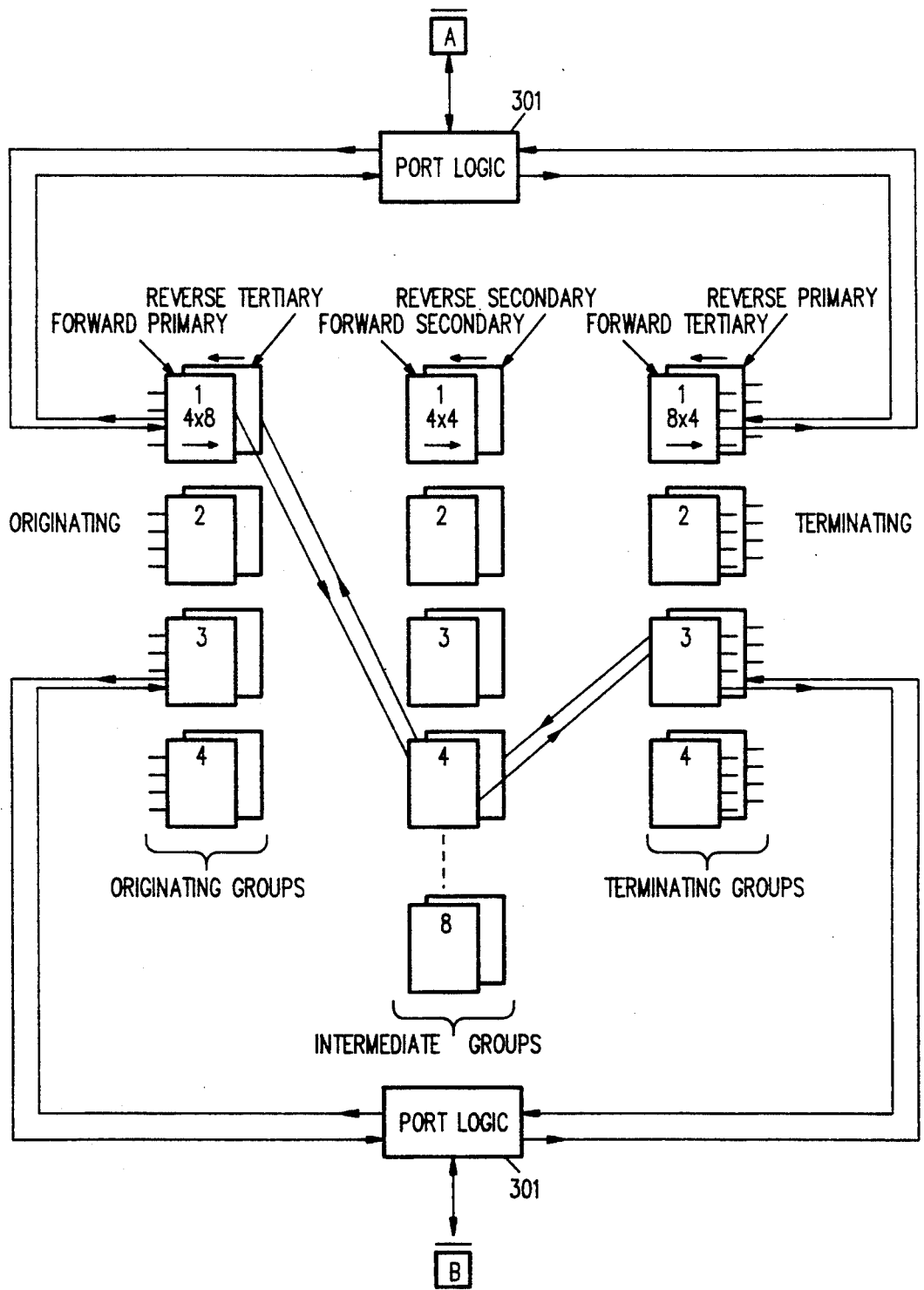
FIG. 3B is a detailed block diagram of a forward and a reverse plane used in the switch groups of the system of FIG. 2A.

Referring now to FIGS. 3A and 3B, one forward and one reverse plane are shown. For simplicity, only those links included in a hypothetical A-to-B connection are included.

Two users, A and B, are shown interfaced to the originating and terminating sides of the switch through port logic 301. The function of port logic 301 is to convert a users connection request to a form suitable for controlling the switch to set up a desired connection path. Once the connection is set up, the port logic 301 associated with the user to which the connection has been directed signals the user that a connection has been made to it. At this point the recipient of the connection may signal through its port logic, the established communication path and the originating user's port logic, its desire to communicate. This signaling is done over the control planes of the switch which were previously used for passing information necessary for path set up. If communications are desired at this point between users, their associated port logic enables transmission between them on the bidirectional data planes of the established connection path. Each port logic 301 transmits a busy indication to each other over the control planes of the connection path for the duration of the connection. When either port logic receives a disconnect request from its user, it stops its busy transmission to the other port logic circuit and signals it that a disconnect is in progress. The control logic in each switching group involved in the connection also detects the absence of busy transmissions from either port logic by monitoring the control planes of the connection path. When this condition is detected, the four plane matrix connections in each group are disconnected, which disrupts the entire connection path.

Each port logic 301 is connected to both the originating and terminating sides of the switch. Connections are established through the originating side by information transmitted from the port to the originating group to which it is attached. The first piece of information received by the originating group is the recipient users terminating group address. The originating group must now select an intermediate group for routing the connection. By selecting an intermediate group a complete connection path has been defined over originating-to-intermediate and intermediate to terminating links. However, before an intermediate group can be selected the busy-idle status of the involved links must be known.

The status of originating-to-intermediate links is available to the originating group since they are connected to it. The status of the intermediate to terminating links is broadcast by each intermediate group to each originating group where there exists an idle link to do so. This broadcast is a time division multiplexed signal transmitted over the reverse control plane of the idle originating-to-intermediate links. The transmitted signal is referred to as the idle scan waveform.

The originating group therefore selects an intermediate group by examining the idle scan waveforms it receives from intermediate groups with which it currently shares an idle link. Of the several possible intermediate groups to which it has an available link, it selects one that also has an available link to the recipient users terminating group. Thus, the switch planes of the present invention find an intermediate group that can make a complete connection before one is actually established.

Upon selecting an intermediate group, the originating group makes a connection to that group and is said to go transparent so that the originating port logic is essentially connected directly to the intermediate group. The originating port is still transmitting the recipients terminating group address which is now used by the intermediate group in setting up a transparent connection to the recipients terminating group in the same way just described for setting up the transparent connection between the originating and the intermediate groups. The originating and intermediate groups are now both transparent, so the originating port is essentially connected directly to the recipients terminating group.

In addition to transmitting additional control information to complete the connection, the originating port begins transmitting a busy indication which is monitored by all three stages of switching. This signal holds the established connection for the duration of its use. The terminating group transmits a signal to the originating port verifying the existence of a connection between them. This signal is followed by the transmission of a busy indication by the terminating group which is monitored by the intermediate and originating stages of the connection and by the originating port. This busy indication is eventually supplied by the recipient's port upon completion of the connection and is used to hold the connection until a disconnection is desired. If at any point during a connection the busy indication in the forward direction (from the originating port) or in the reverse direction (from the recipient's terminating group) is interrupted, a circuit failure or contention is assumed and the present connection is aborted and a retry connection is made.

The originating port now sends the address of the line to which the recipients port is connected. This is referred to as a line address and is time multiplexed with the busy indication over the forward control plane of the connection route. The terminating group checks the line address with the busy-idle status of the addressed line. If the line is busy, a negative response is time multiplexed with the busy indication over the reverse control plane of the connection. Next, the busy indication is stopped, which disconnects the entire connection path. The originating port logic indicates to its user a busy was encountered and the operation is complete.

If the addressed line is not busy, a positive response is transmitted to the originating port and a connection is established through the terminating group to the recipient's port. Upon receiving a busy indication transmission from the originating port, the terminating port begins transmitting a busy indication in place of the one previously supplied by the terminating group. The terminating group is now transparent and, essentially, a direct connection exists between originating and terminating ports. The function of each stage of switching now is to monitor busy indications in both directions (from both port logic circuits), and hold the established connection until busy indications cease.

The recipients port now indicates to its user a connection has been made to it. At this point, the two users may "hand shake" through their ports over the control planes of the connection. When data transmission is desired between users, the ports simply connect them to the data planes of the connection. When either user desires a disconnection, its port ceases transmission of the busy indication. This condition is detected at the other port, and at all switching groups through which the connection passes. The entire connection is therefore disconnected. It should be noted that users may desire to "hand shake" through their ports and the control planes of the connection before a disconnection occurs.

To summarize the connection process, an originators port transmits a recipients terminating group address to its originating group. The originating group compares the address with the idle-scan waveforms it receives from various intermediate groups. On this basis, it selects an available intermediate group capable of completing a connection to the recipients terminating group. It then makes a connection to the selected intermediate group and goes transparent. The recipients terminating group address is now available to the intermediate group which makes a connection to the terminating group and goes transparent. The terminating group sends a signal to the originators port verifying the connection exists. The originators port and the terminating group send busy indications to each other continuously, time multiplexed with other information on the control planes of the connection. Originating and terminating groups involved in the connection are completely transparent, but monitor the busy indications holding the connection path. The terminating group receives the recipients line address from the originators port and determines whether that line is busy. If the line is busy a negative response followed by the termination of busy indications is transmitted to the originator port. This causes the connection to be completely disconnected. If the line addressed is not busy, a positive response is sent to the originators port and a connection is completed from the originators port to the recipients port. The users may then communicate over the data planes of the connection path preceded by a "hand shake" process, if needed. This "hand shaking" would be handled by the ports over the control planes of the connection. When a user desires to disconnect, its port ceases busy indications and the connection is broken. A disconnection, in the same manner as a connection, may be preceded by a user "hand shake".

The present invention includes a relocate function. This function allows a user to move to a different location and maintain the same address on the switch without rewiring. This function can be implemented on a permanent basis for relocation or on a temporary basis for call forwarding.

A user, when first attached to the switch, is assigned a physical address corresponding to the line to which attachment is made. All connections directed to the user are made using this physical address. If the user moves to a new location which is connected to the switch on a different line, rewiring would be necessary to maintain the old physical address. However, with the relocate function, connections would progress through the switch to the terminating group of the old location. After receiving the line address, the terminating group normally transmits a positive or negative response to the originating port and completes or breaks the connection according to the busy-idle status of the addressed line. However, in the case of a relocate, the new address, which is stored in the terminating group, is transmitted to the originating port and the connection is broken. The originating port makes a second connection using the new address obtained during the first attempted connection.

Addresses originally assigned to users are referred to as assigned addresses. The address required to make a connection to the users present location is referred to as a current address. The assigned address is the same as the current address for all users who do not relocate All relocated users have a current address stored in the terminating group associated with their assigned address. In a sense a distributed directory exists in the terminating groups.

Transmission of user information on the data planes of a connection is completely transparent and asynchronous to switch control timings. Information transmitted by ports and terminating groups for switch control on the other hand is completely synchronous with switch timings Referring to FIG. 4, an information format with four time slots each subdivided into S (status) and C (control) portions is the basis for all switch timings.

Figure 4:
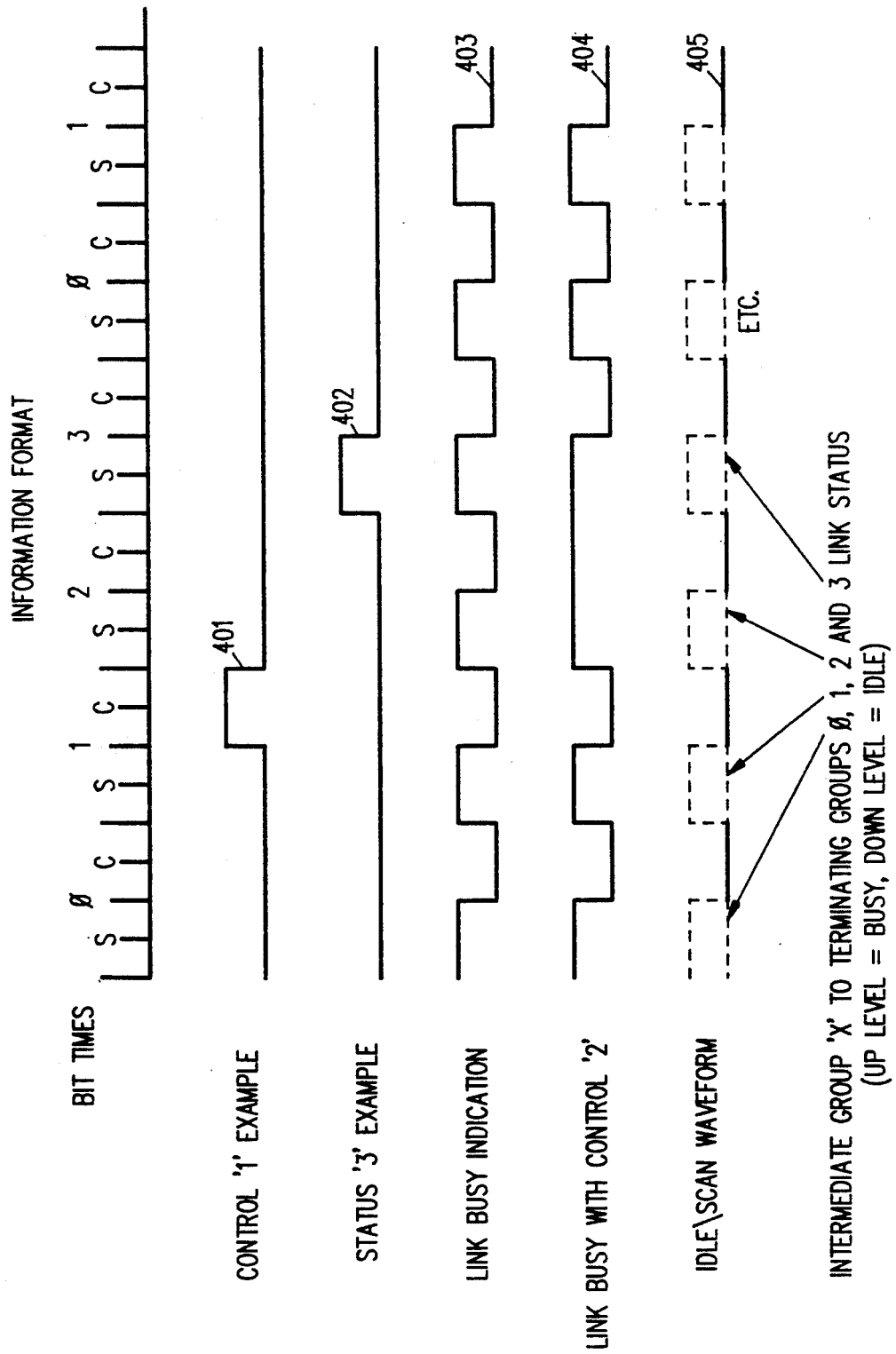
FIG. 4 is a time diagram and format of status and control information transmitted by the switch groups of the system of FIG. 2A.

Two types of information are transmitted using this format. One is control, transmitted during the C portion of time slots, the other is status, transmitted during the S portion of time slots. The transmission of a Control '1' and a Status '3' is shown in FIG. 4. Busy indication 403 referred to elsewhere in this specification comprises a continuous series of S pulses. The line address transmission and other information transferred during the transmission of busy indications is time multiplexed with the busy indications. An example of such multiplexing is Link Busy with Control '2', waveform 404. All control information transferred after busy indications have started is time multiplexed in this manner.

Idle-scan waveform 405 is transmitted to each originating group from each intermediate group over all idle originating-to-intermediate links. This waveform, transmitted from a given intermediate group contains the busy idle status of that particular group's links to terminating groups. The status of each link to terminating groups 0, 1, 2 and 3 is transmitted during the S portion of time slots 0, 1, 2 and 3, respectively, to compose the idle-scan waveform.

Figure 5:
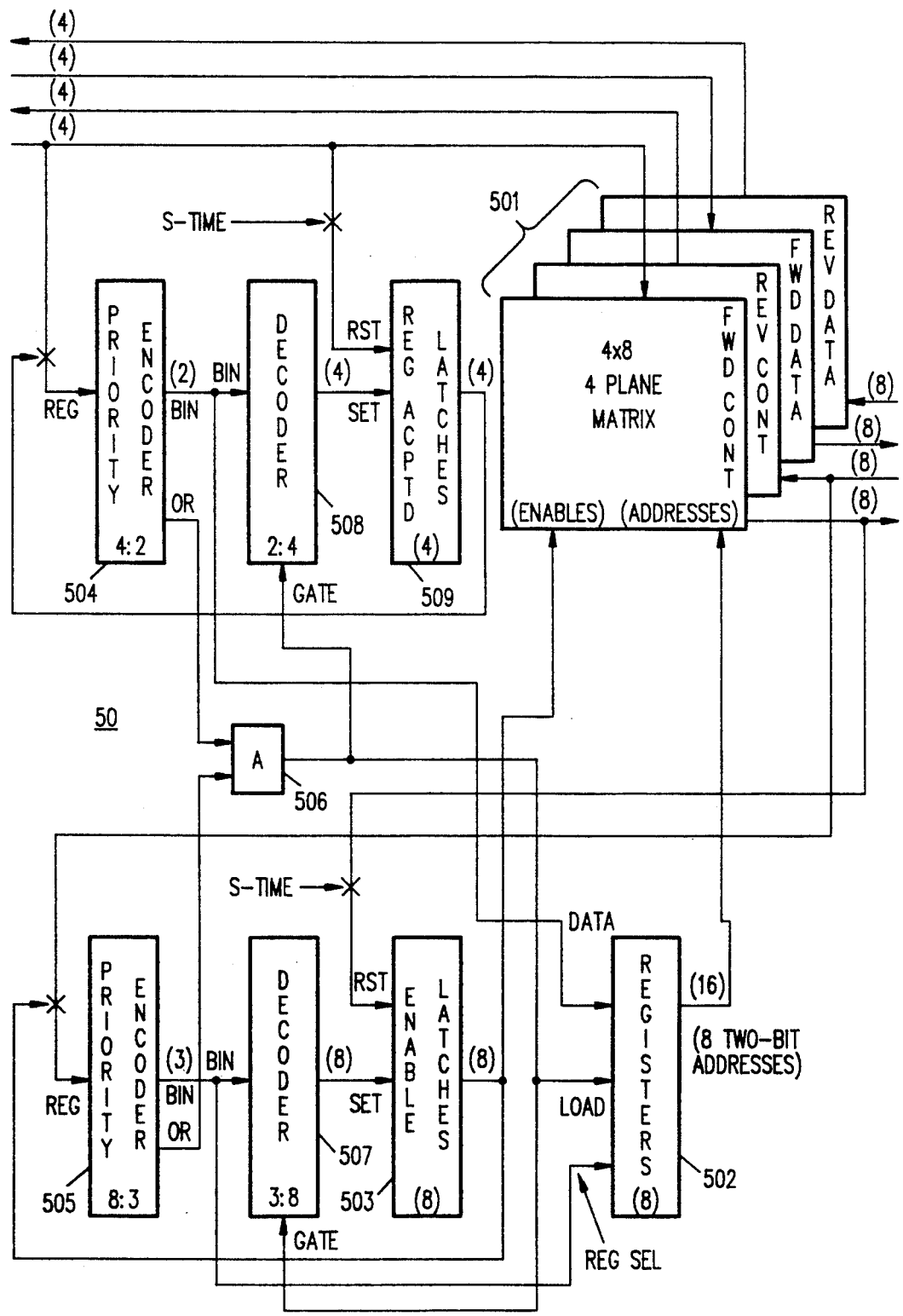
FIG. 5 is a block diagram of the control logic and switch matrices for an originating switch group used in the system of FIG. 2A.

Referring to FIG. 5, the control logic for an originating switch group 50 is shown. Stack of matrices 501 is controlled by this logic. The function of logic 50 is to compare a terminating group address presented by a port with several possible idle scan waveforms from various intermediate groups to determine through which intermediate group the connection should be routed. Once this determination is made, one of eight two-bit addresses controlling the four matrices in parallel must be set up to direct the connection to the desired intermediate group. When the address is set up, the associated enable line is activated and the group becomes transparent to the connection. The forward control link to the intermediate group is then monitored for busy indications to determine when to deactivate the enable line thus breaking the connection.

Figure 6:
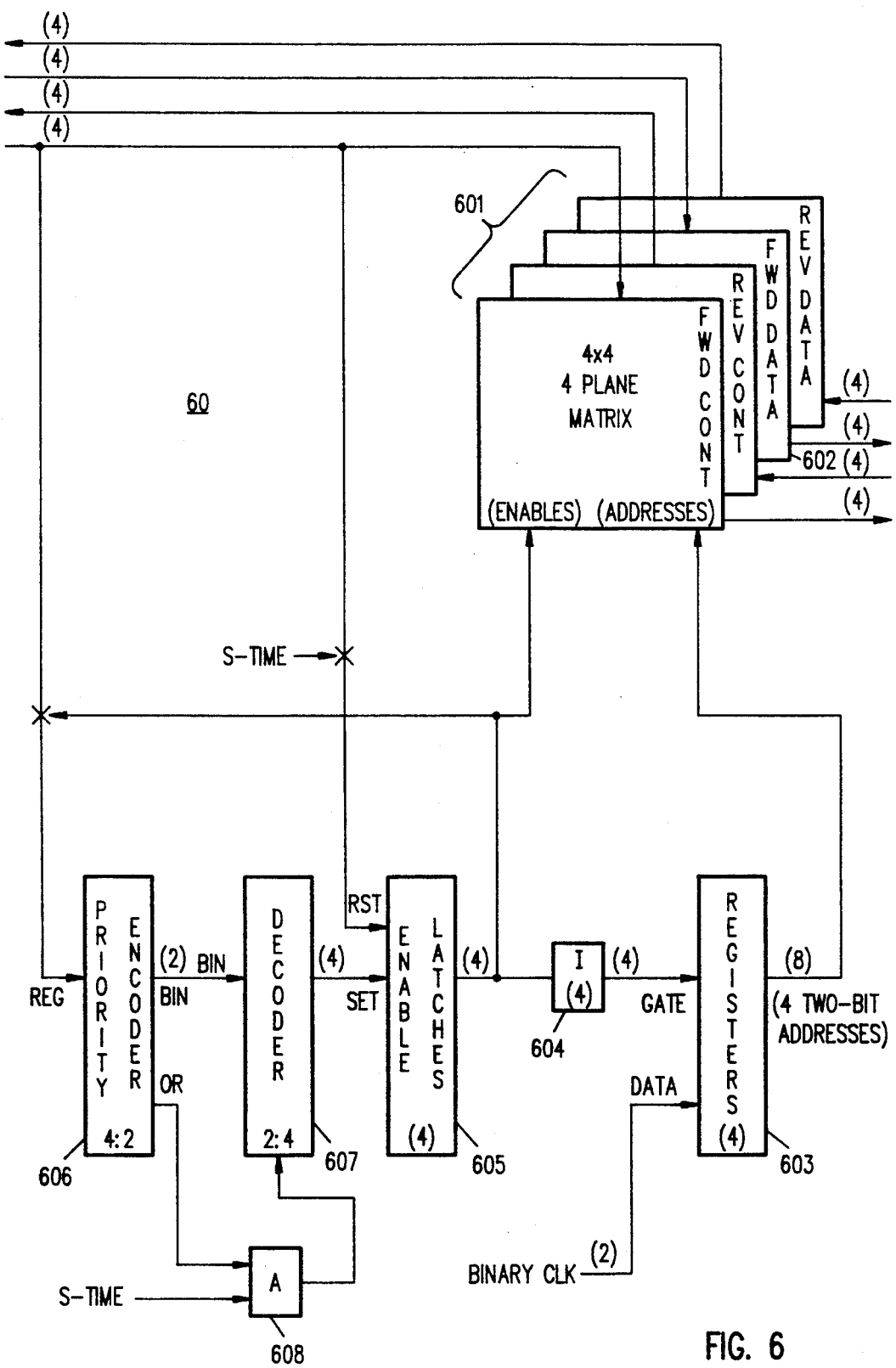
FIG. 6 is a block diagram of the control logic and switch matrices for an intermediate switch group used in the system of FIG. 2A.

FIG. 6 shows the control logic and associated matrices for an intermediate switch group 60. One of the functions of this logic is to produce idle-scan waveforms on all reverse control lines of idle links to the originating groups 50. This is accomplished by making connections in reverse control matrix 602 of stack of matrices 601 from terminating groups 0 through 4 sequentially and in synchronism with the switch transmission time slots 0 through 4, respectively. Connections are made in this manner between terminating and originating groups where an idle link exists, and are only enabled during the S portions of the TDM time slots.

With the switch architecture of the present invention, originating group 50 receives a sample of the information transmitted from each terminating group over the reverse control plane during the S portion of each time slot. In this way, originating groups 50 are essentially coupled to connections that exist (if the intermediate-to-terminating link is in use) or links that are idle. When so coupled to a link already in use during S time (S portion of a time slot), an originating group 50 receives the busy pulse (one pulse of a string of busy indications which occurs each S time) emitted by the terminating group using the link. When tapped in on an idle link, the originating group 50 receives no busy pulse. By examining the idle-scan waveform, an originating group 50 knows which intermediate-to-terminating group links are in use, since idle-scan connections are synchronous with time slots. For example a busy pulse received in time slot 2 was emitted by terminating group 2 since all intermediate groups make idle scan connections to the links from terminating group 2 during that time slot.

In summary, reverse control transmissions from each terminating group are multiplexed in sequence over idle intermediate-to-originating group links. This is accomplished by causing the intermediate group reverse control matrices 601 to perform a commutating function in the usual manner.

The other function of the intermediate groups 60 is to receive a terminating group address on an originating-to-intermediate group link from an originating port 301, and use the address to set up one of four two bit address registers controlling its stack of matrices 601 to direct the connection to the appropriate terminating group. The terminating group address transmission consists of a pulse during the S portion of the time slot which corresponds with the terminating group address. Therefore a terminating group address pulse is coincident with the intermediate group's commutation of the link to that terminating group. An address pulse for a terminating group received on an idle link freezes the commutating action for that link, thereby setting up the address for the connection. At this point all four matrices in the intermediate group are enabled for the connection. A transparent path now exists between the originating port and the recipients terminating group. The function of the intermediate group now is to monitor the busy indication on the forward control plane of the originating-to-intermediate link and disable the connection when the busy indications cease.

Two types of control logic are used in a terminating group 70. Line request logic 702, detailed in FIG. 8A, appears eight times in a terminating group and line status logic 703, detailed in FIG. 8B, appears four times.

Figure 7A:
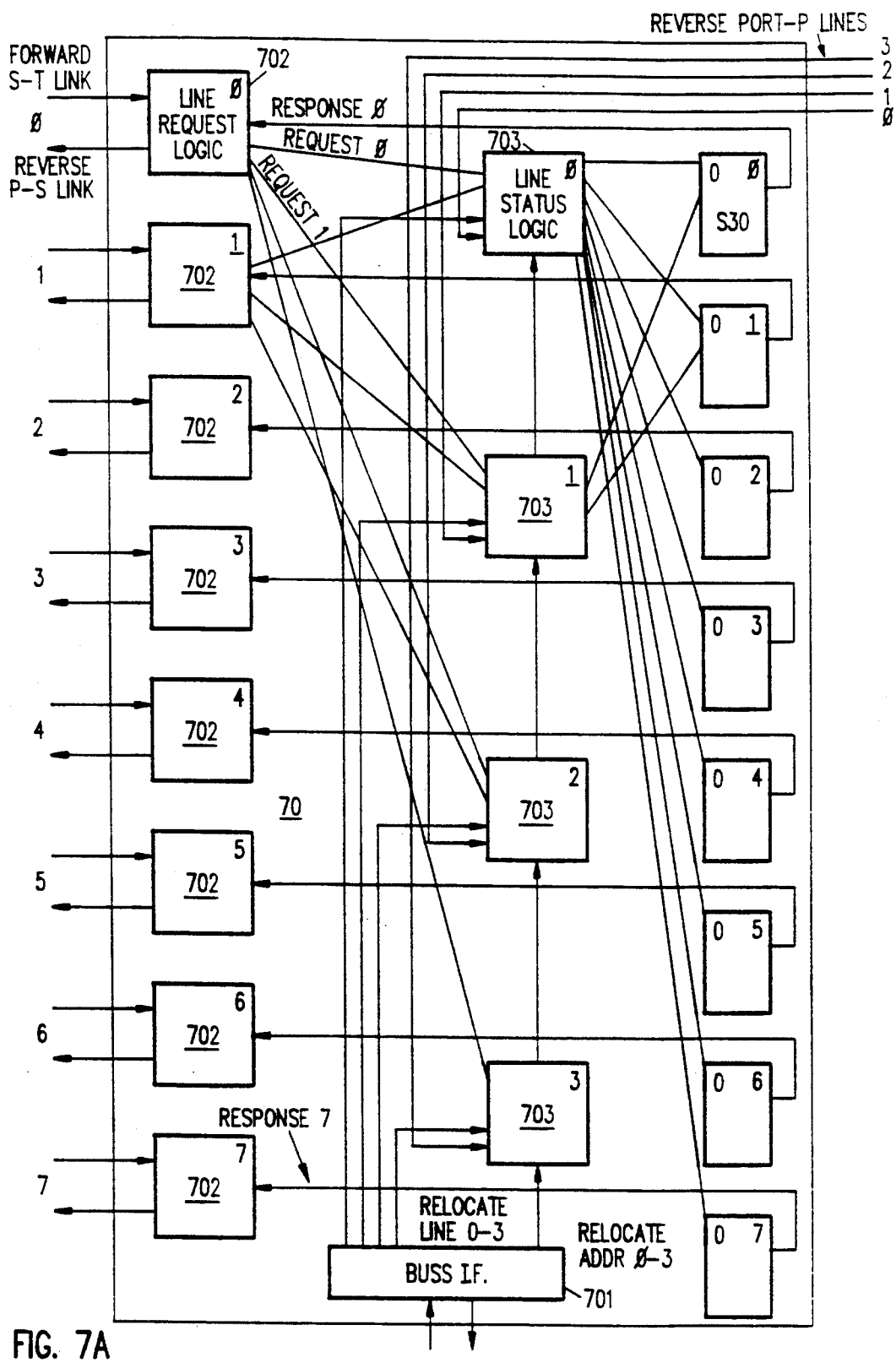
FIG. 7A and 7B are block diagrams of the control logic and switch matrices, respectively, for a terminating switch group used in the system of FIG. 2A.
Figure 7B:
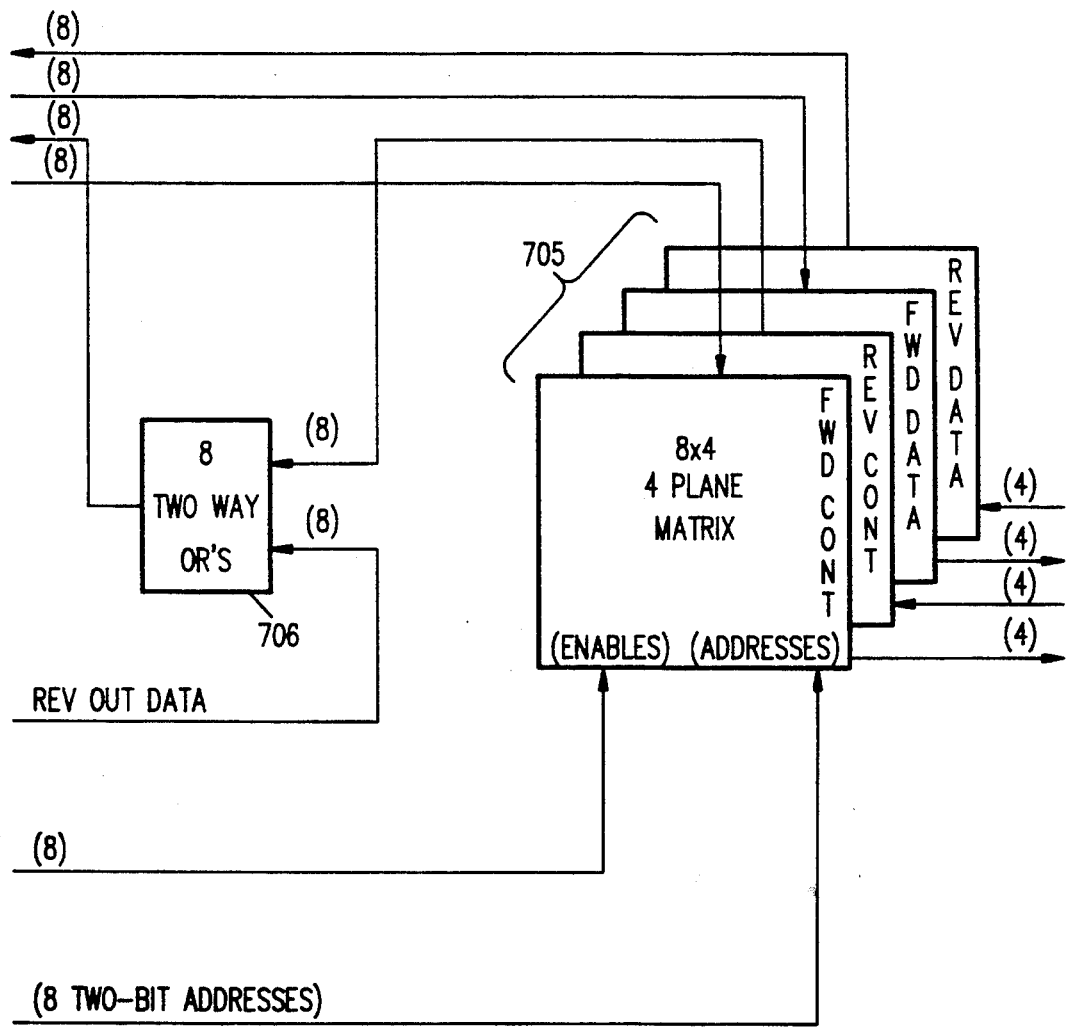

FIGS. 7A and 7B show the arrangement of logic circuits and switch matrices comprising a terminating group 70, which also includes a circuit referred to as the bus interface 701.

Figure 8A:
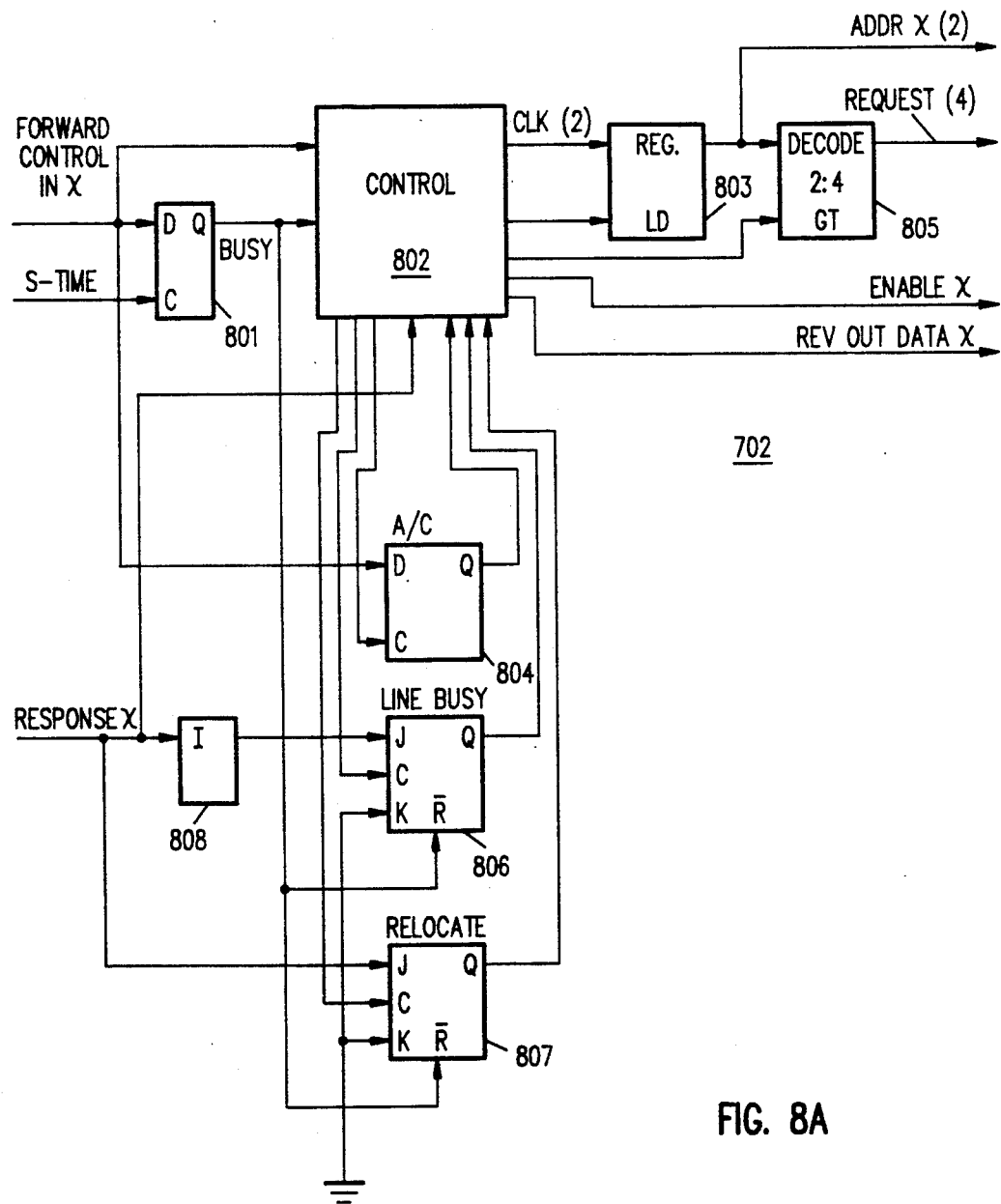
FIG. 8A is a block diagram of the line request logic used in the terminating switch group of FIGS. 7A and 7B.

Referring to FIG. 8A, the function of line request logic 702 is to interface each of eight intermediate-to-terminating group links. Logic 702 receives the terminating group address pulse as an indication that a connection request is to follow. At this point, line request logic 702 transmits a pulse to originating port 301 to verify that the connection is established to a terminating group. Busy indications are then transmitted by a terminating group 70 and indications by a port 301 are monitored during the connection request. The request consists of a line address transmission followed by an address type transmission. At this point, the terminating group is communicating directly with the originating port through the connection established thus far.

The line address transmission indicates to which of the four lines to user ports 301 the connection is to be directed. The address type qualifies the address as either user-supplied or relocate-connection-supplied. A relocate connection-supplied address is received by a originating port 301 as a result of an attempted connection to a user which has been relocated or has invoked the call forwarding function. Upon receiving the line address and qualifier, line request logic 702 interrogates line status logic 703. Line status logic 703 are arranged one per user port 301, and contain the busy-idle status and relocate information for their associated port.

If the line address is qualified as a user-supplied address, i.e. an assigned address, line request logic 702 interrogates the line status logic 703 associated with the addressed line for relocate and busy-idle status information. If relocate is active for the line, the status logic returns a relocate address to the line request logic which transmits it to the originating port 301. The line request logic 702 then ceases busy indications and resets. Thus, a relocate connection is completed.

If relocate is not active but the line is busy, a negative response (interpreted as line busy) is transmitted to the originating port 301. This is followed by termination of busy indications and reset of the line request logic 702, thus ending the connection attempt.

If relocate is not active and the line is not busy, or if the line address is qualified as a relocate-connection-supplied address (current address), the line request logic sends a connection request to the appropriate status logic 703. The line status logic 703 sets its busy status latch and returns a connection response to the line request logic 702, assuming no contention exists. Contention is described elsewhere in this specification.

If no response is received by the line request logic, another line request logic 702 having higher priority has simultaneously requested connection to the same line status logic 703. This is treated in the same way as line busy, since the line is now busy. Assuming no contention, the line request logic 702 transmits a positive response to the originating port 301, indicating that a connection is established, and activates its enable line to the four plane terminating group switch matrix 705. The address controlling the connection was set-up previously by the line request logic 702 upon receiving the line address transmission.

Since a connection is made to the recipient users port 301, busy indications from the originating port 301 are now received, indicating that a connection has been established The recipient port responds with busy indications to the originating port. For a short period of time, the line request logic 702 continues transmitting busy indications which are "ORed" with transmissions from the recipient port. This is done to maintain a continuous busy indication transmission in the reverse control planes of the connection while the recipient port assumes the role of maintaining the connection.

The ports 301 now communicate, if necessary, through the control planes of the switch and connect their users to the data planes to complete the connection The line request logic 702 monitors the forward control intermediate-to-terminating group link for busy indications to deactivate the switch matrix enable line when they cease. The line status logic monitors busy indications on the reverse control terminating group-to-port line to reset the line busy latch when they cease.

As mentioned elsewhere in this specification, bus interface circuit 701 is also part of a terminating group 70. Its purpose is to receive relocate information and send it to the appropriate line status logic within its terminating group.

Some of the communication lines between the eight line request logic 702 circuits, and the four line status logic 703 circuits are shown in FIG. 7A. Request lines 706 exist from each request logic circuit to each status logic circuit. A request is directed from a line request logic circuit by the received line address to the appropriate status logic circuit. Requests for relocate and status information and requests for connection are made over these lines. A line from each status logic circuit is "ORed" to form a response line to each line request logic circuit. A response to the two different types of requests is directed to the requesting line request logic circuit on which the request was received.

Referring again to FIGS. 3A and 3B, a typical A to B connection is shown. Note that user A's port interface to the terminating side of the switch is unused. This could allow another user to make a connection to A even though A is connected to B. In certain applications this may be desirable and in others it may not. In the present implementation, user A's port sends busy indications to its terminating group shortly before initiating the connection procedure. The indications are detected by the line status logic circuit associated with user A's port which causes the line busy latch to set. This action causes subsequent connection requests to A to result in a busy condition If this type of operation is not desired, busy indications are simply not sent to the terminating group by a port prior to originating a connection. In fact, 16 users capable of initiating connections only could be connected to the originating side of the switch and 16 users capable of terminating connections only could be connected to the terminating side of the switch. This would allow up to 16 simultaneous connections. These configuration considerations are application dependent and require no changes to the switch control logic. Referring again to FIG. 5, the basic function of this logic is to establish a connection between a port 301 and an intermediate group 60 upon receiving a terminating group 70 address from the port and on the basis of status information from all intermediate groups. This logic must also monitor busy indications which hold the connection until they cease, at which time it must break the connection.

Figure 9:
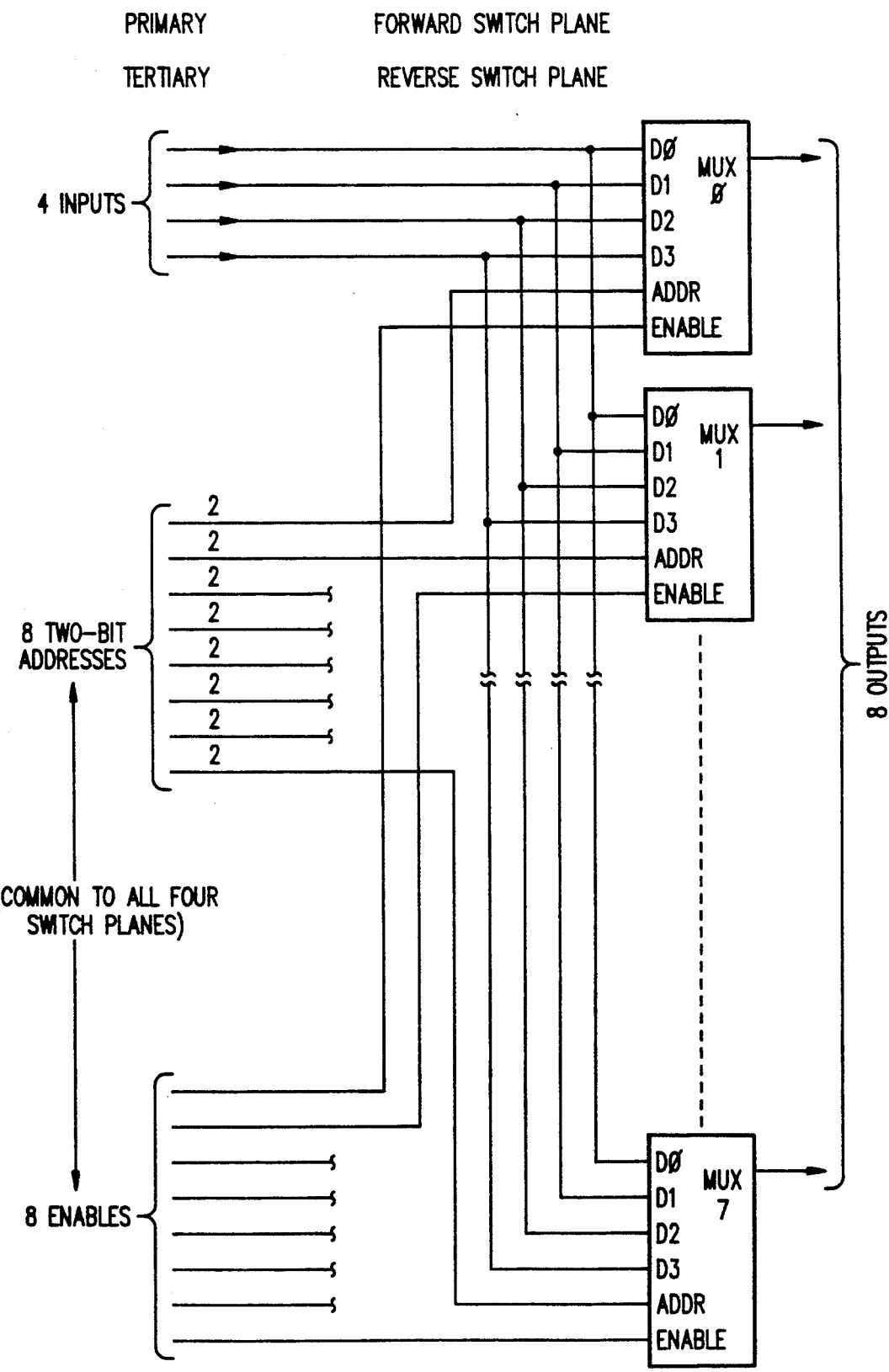
FIG. 9 is a block diagram of a switch matrix incorporated into the forward control and data planes of the originating switch group of FIG. 5.
Figure 10:
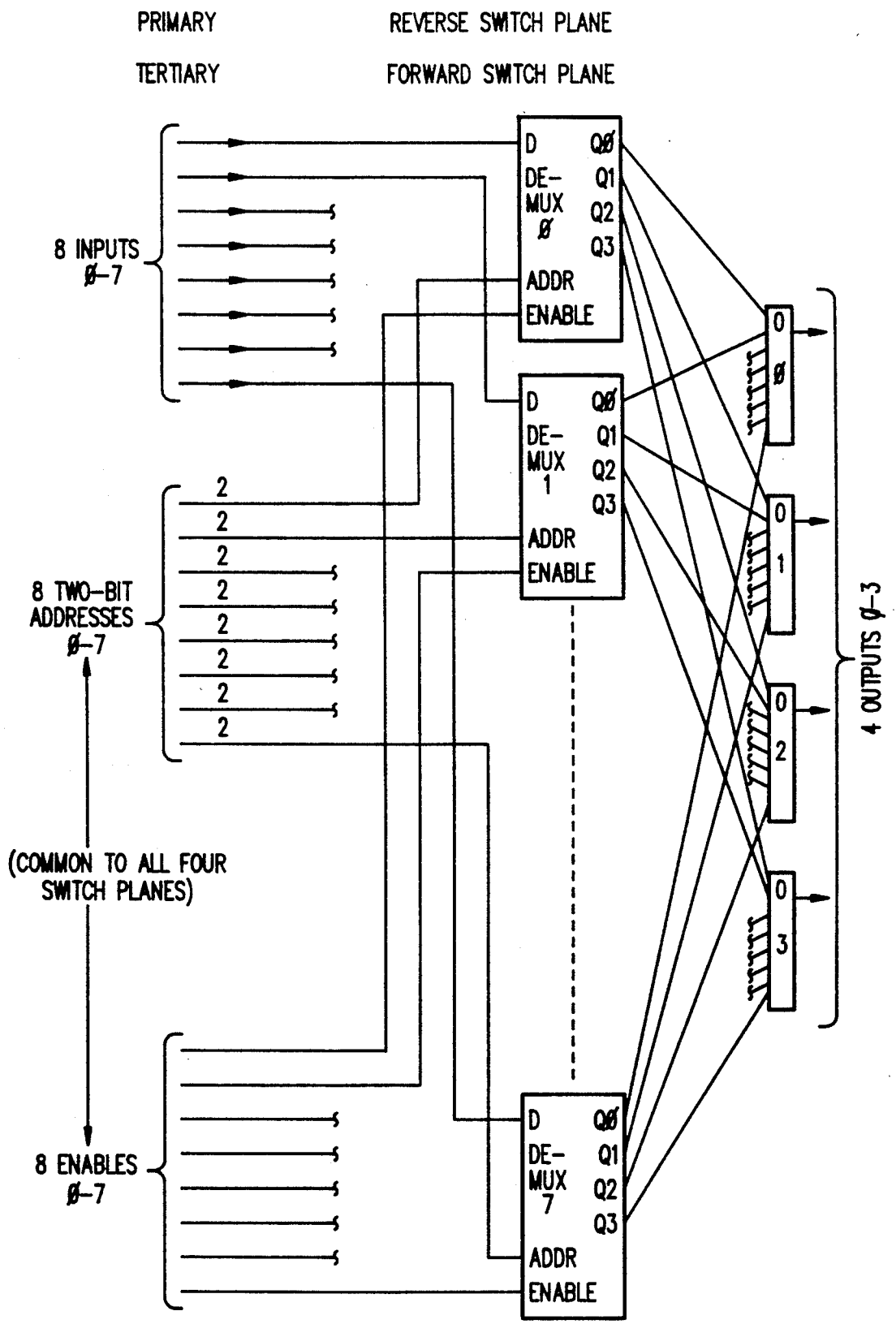
FIG. 10 is a block diagram of a switch matrix incorporated into the reverse control and data planes of the originating switch group of FIG. 5.

FIG. 9 shows the switch matrix incorporated in the primary forward control and data planes of the originating groups 50. FIG. 10 shows the switch matrix incorporated in the primary reverse control and data planes of the originating groups 50. The 4 inputs to MUX 0 in FIG. 9 represent the forward control or data lines from 4 attached ports 301. The 8 outputs represent the forward control or data links to each of 8 intermediate groups 60.

In order to set up a connection from an input to an output, a two-bit address designating the desired output must be supplied to a multiplexor circuit (MUX). To enable the connection, an enable line to a MUX must be activated. Referring now to FIG. 5, addresses and enables to MUX's 0 through 7 are supplied by address registers (0 through 7) and enable latches 503 (0 through 7), respectively. Therefore, a connection from an input to an output is established by setting a value equal to the address of the input into an output register and setting the corresponding enable latch. This holds true for both the forward control and data connections.

Referring now to FIG. 10, the 8 inputs represent the reverse control or data links from each of 8 intermediate groups 60. The 4 outputs represent the reverse control or data lines to 4 attached ports 301. The parallel connection for the previously described input-to-output forward plane connection is an input-to-output reverse plane connection, since signals in forward and reverse planes travel in corresponding opposite directions.

In order to establish a reverse plane connection, a De-MUX must be supplied an address designating the output and the corresponding enable line must be activated. If address registers 0 through 7 and enable latches 0 through 7 connected to the MUX's in the forward planes were also connected to De-MUX's 0 through 7 in the reverse planes, an input-to-output connection in the reverse planes could be established by setting a value equal to the address of the reverse input into the register of the reverse output, and setting corresponding enable latch Y. This is the same procedure which sets up the parallel forward plane input-to-output connection.

Since forward inputs and reverse outputs are associated with the same port, and since forward outputs and reverse inputs are associated with the same intermediate group, a connection from the port to the intermediate group is established by setting a value equal to the address of forward inputs and reverse outputs into the register of the forward outputs and reverse inputs and setting the corresponding enable latch. This is the function of the originating group control logic In FIG. 5, switch matrices 501 are represented by superimposed blocks labeled A. The registers 502 and enable latches 503 control the matrices as described.

Figure 11:
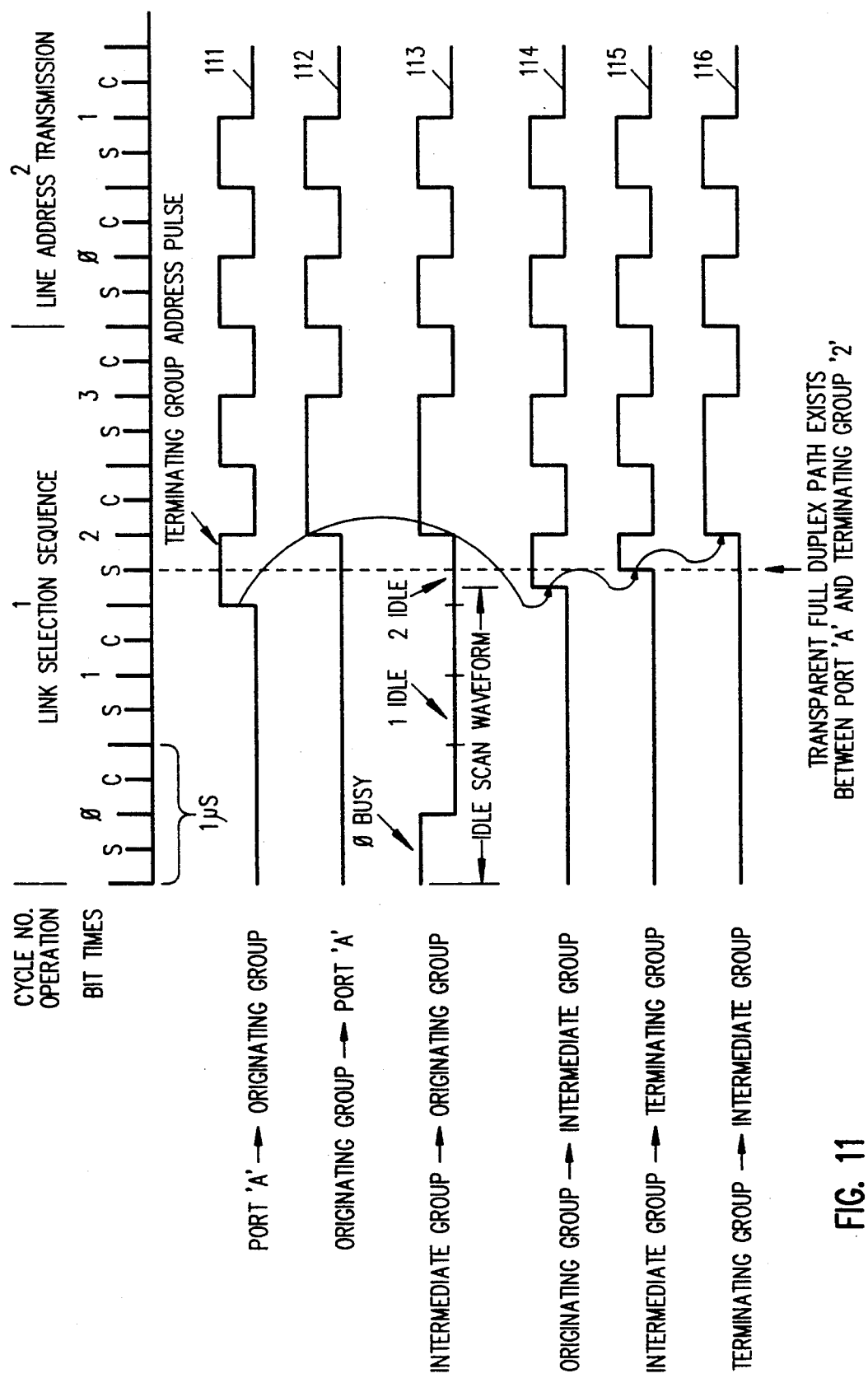
FIG. 11 is a timing diagram of the link selection sequence of a hypothetical port A to port B connection in the switching matrix of FIG. 3B.

FIG. 11 is a timing diagram of the link selection sequence of the port A to port B connection of FIG. 3B. Link selection establishes a connection from port A to the terminating group of port B. In this case, port A transmits the terminating group address of B, which is 2 by generating a pulse during the S portion of time slot 2. See waveform 111. This address is received over the forward control line by priority encoder circuit 504 which generates a binary address equal to the line number of the originating port. This address is available at a group of selectable registers 502.

Simultaneously presented to the originating group over the reverse control links from one or more intermediate groups is the idle-scan waveform timeslot associated with the addressed terminating group-to-intermediate group link. Waveform 113 of FIG. 11 shows one such idle-scan waveform. These waveforms are received by priority encoder 505, which generates a binary address equal to the address of the lowest order intermediate group presenting a link idle indication. This address is used to select which register 502 will be loaded with the originating port line address generated by circuit 504.

Since circuits 504 and 505 both have active inputs (a terminating group address and at least one idle indication, respectively), "and" circuit 506 causes a register in circuit 502 to load. If the originating port line address is equal to X and the lowest order intermediate group to provide an idle is equal to Y, an address of X is loaded into register Y. This completes the address setup requirement of the matrix for an originating port to intermediate group 60 connection.

The output of "and" circuit 506 also gates a decoder circuit 507, which sets the Y enable latch of enable latch 503, since the decoder binary input comes from circuit 505 which has an output presently equal to Y. This completes the enabling of the previously addressed connection. The enable latch being set also disconnects the intermediate group's reverse control transmissions from circuit 505 for the duration of the connection. The output of "and" circuit 506 also gates decoder 508, which sets the X request accepted latch of latch 509 since circuit 504 is presently generating a value of X. The output of the request accepted latch circuit 509 inhibits the originating port X from generating erroneous requests for the duration of the connection.

At the time the connection was enabled, the pulses of waveform 111 in FIG. 11 are switched from the originating port to the selected intermediate group generating waveform 114. Subsequent connection sequence details are described in following sections covering the intermediate and terminating group control logic.

The terminating group address pulse is the first pulse in a sequence of busy indications transmitted by the port, i.e. waveform 111. If the busy indications should cease during the remainder of the connection or after a connection has been established, request accepted latch 509 and enable latch 503 will be reset, since both sample the forward control plane of the connection during the S portion of time slots Resetting latch 509 allows further requests from port X to be accepted. Resetting latch 503 allows the link to the intermediate group to be considered for use in subsequent connections and causes the switch matrix to be disabled breaking the connection path in the originating group.

A block diagram of an intermediate group 60 is shown in FIG. 6. The basic function of this logic is to establish a connection between an originating group 50 and a terminating group 70 upon receiving the remainder of an intermediate group address pulse from an originating port through an originating group. See waveform 114 in FIG. 11. Upon establishment of the connection, it must monitor busy indications which hold the connection until they cease, at which time it must break the connection. The logic must also transmit idle-scan waveforms over all idle links to originating groups.

Figure 12:
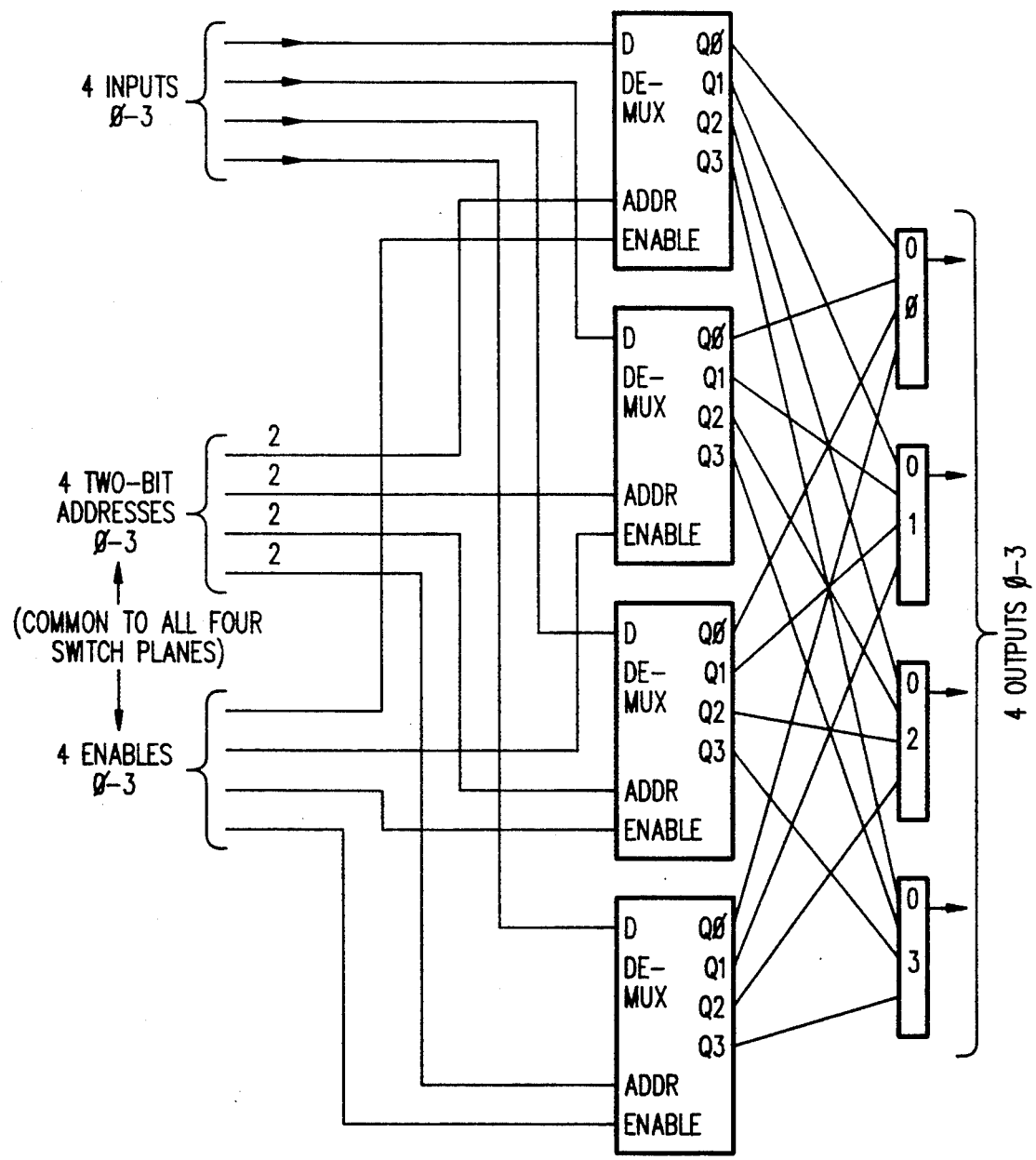
FIG. 12 is a block diagram of a switch matrix incorporated into the forward control and data planes of the intermediate switch groups of FIG. 6.
Figure 13:
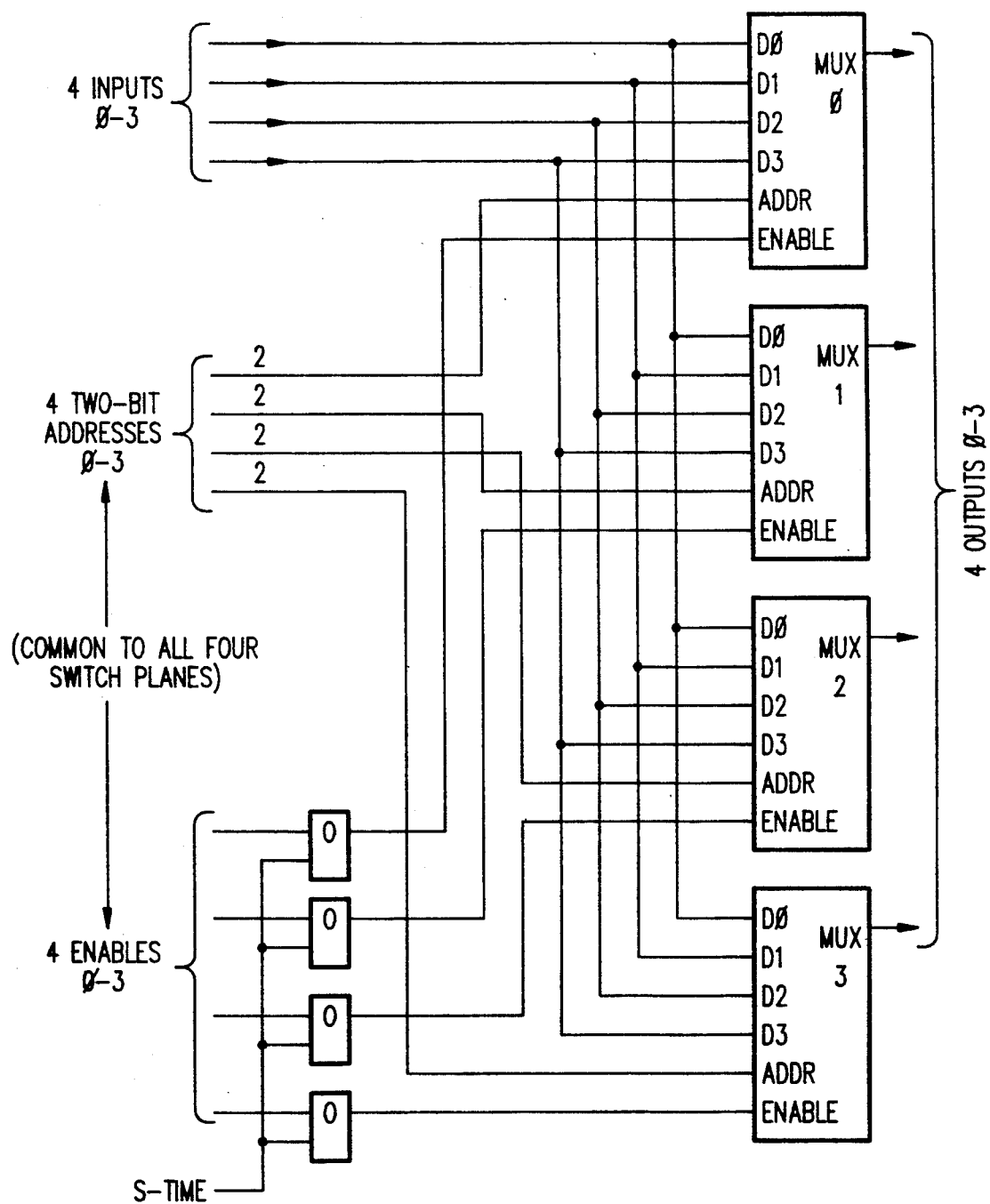
FIG. 13 is a block diagram of a switch matrix incorporated into the reverse control and data planes of the intermediate switch groups of FIG. 6.

FIG. 12 shows the switch matrix incorporated in the forward control and data planes of the intermediate groups 60. FIG. 13 shows the matrix incorporated in the reverse control and data planes of these groups. Referring to FIG. 12, the 4 inputs represent 4 control or data links from the 4 originating groups 50. The 4 outputs represent 4 control or data links to the four terminating groups 70. Referring to FIG. 13, the 4 inputs represent 4 control or data links from the 4 terminating groups and the outputs represent links to the 4 originating groups 50. The two types of matrices share common addressing and enabling lines. The addresses are provided by four two-bit address registers 0 through 3 and the enables are provided by four enable latches 0 through 3 This arrangement of common addressing and enabling of forward and reverse planes is the same as that described earlier for the originating groups 50. Also, in a manner similar to the originating group matrices 501, it can be demonstrated that in order to establish a connection between an originating group and a terminating group, it is necessary to set an address designating the terminating group 70 into a register of the originating group 50 and set the corresponding enable latch. This is therefore the function of an intermediate group in establishing an X to Y connection.

Referring to FIG. 6, generation of the idle-scan waveform was earlier defined as a commutating action in the intermediate group reverse control switch planes.

This action assembles the S portions of reverse control terminating group to intermediate group transmissions into a single time division multiplexed signal which is distributed to all originating groups where an idle link exists. The transmissions received from terminating groups 0 through 3 are assigned time slots 0 through 3 of the idle-scan waveform respectively. Since the commutation is only enabled during S portions of timeslots, the idle-scan waveform is composed of the presence or absence of busy indications from a given terminating group 70 during its respective timeslot Thus, an originating group 50 observing the idle-scan waveform received from a given intermediate group 60 knows the busy-idle status of all links from that intermediate group 60 to terminating groups 70.

The commutating action is generated as follows. Referring to FIG. 13, each of the four reverse switch plane outputs is controlled by a MUX (multiplexor) circuit which selects one of four inputs controlled by its respective address register 0 through 3 and enable latch 0 through 3. Assume FIG. 13 represents the reverse control matrix The MUX associated with each output line that is part of an idle link to an originating group must provide a commutating action. The address registers associated with such MUX circuits must provide an address equal to 0 during time slot 0, and address of 1 during time slot 1, etc., in order for the desired commutation to occur. The four "OR" circuits on the MUX enable lines provide the necessary enabling during S portions of the time slots. It should be noted that the reverse data plane need not be enabled during S times.

Circuit 603 in FIG. 6 contains the address registers. Each of the registers are provided a binary clock as an input. The binary clock is synchronized with the time slots and thus represents the addressing necessary for commutation. Each individual register has a gate line which causes a register's output to follow its input as long as the line is activated. Each register 0 through 3 has a gate line which is derived by invertor 604 at the output of enable latches 605 0 through 3 respectively. Thus, as long as an originating-to-intermediate link 205 does not have a connection associated with it, the respective enable latch 605 is not set, which causes the respective address register 603 to follow the binary clock signal resulting in a commutating action in the respective MUX circuit (FIG. 13). When a connection over a given link is established, the associated enable latch 605 will be set, causing the commutating action to stop with the last commutation address stored in the respective address register.

Connections through an intermediate group 60 are established as follows. Referring to FIG. 11, waveform 114, and FIG. 6, the remainder of a terminating group address pulse is received from originating group X over the forward control plane of link X. This pulse is received by priority encoder circuit 606 on its input X causing it to generate a binary address equal to X. The address is in turn decoded by circuit 607 to produce a set pulse to enable latch 605. The decoder enable line is gated at "AND" circuit 608 by the OR output of circuit 606, which indicates the presence of an address and "S time delayed", which allows the address outputs of encoder 606 to stabilize. Since enable latch 605 has been set, the current address Y contained in address register 603 is trapped and the four plane connection path is enabled thus completing a connection from originating group X to terminating group Y. The address trapped in register 603 is equal to Y, since the terminating group address pulse for group Y occurs during timeslot Y coincident with the commutation of terminating group Y. The set condition of the enable latch also prevents subsequent information on link X from reaching input X of encoder 606.

In summary, terminating group Y is commutated during timeslot Y to all originating groups 50. An originating port 301 attached to originating group X desiring a connection to terminating group Y transmits a pulse also during timeslot Y. Originating group X, upon simultaneously receiving the pulse from originating port 301 and the terminating group Y commutation from one or more intermediate groups, establishes a connection to intermediate group 60. This connection occurs during the first half of the S portion of timeslot Y so that the remainder of the pulse form the originating port 301 arrives at the selected intermediate group 70 on its input X. Since the intermediate group 70 receives the pulse on its X input, enable latch 605 is set, trapping the current commutation address Y in register 603 and enabling the originating group X to terminating group Y connection.

Once a connection is established, the remainder of the original pulse sent from the originating port 301 (terminating group address pulse) is passed through the transparent intermediate group connection to the terminating group 70. See FIG. 11, waveform 115. The function of the intermediate group 60 regarding the connection now is to monitor busy indications and reset the enable latches 605 when the busy indications cease, breaking the connection. This is accomplished by sampling the forward control plane of the connection at S-time and generating a reset to the enable latch if a busy pulse is not present, i.e. circuit 605 at the RST input. When a reset of the enable latch occurs, the switch planes for the connection are disabled, commutation on link X continues and the link X input to priority encoder 606 is re-established to allow subsequent connections to occur on link X.

Terminating group 70 consists of an arrangement of eight line request logic circuits 702, one per link, and four line status logic circuits 703, one per line. The function of the status logic 703 is to maintain the current busy-idle status of its associated line to a user port 301, store the relocate information presented by the bus I. F. logic 701 and present this information to request logic circuits 702 upon demand. Bus I.F. logic 701 receives relocate information on a serial bus connected to all terminating groups 70, and routes the information to the appropriate line status logic 703 circuit for use. The function of the request logic 702 is to detect connection requests, receive a line address and address qualifier, interrogate the appropriate status logic circuit 703 and, based on status logic responses therefore, make a connection to a user port 301, return a line busy indication or relocate address to the originating port.

FIGS. 9 and 10 show the matrices incorporated in the reverse and forward control and data planes of the terminating groups 70. As in the originating and intermediate groups 50 and 60, respectively, the forward and reverse planes are controlled by common addresses supplied by address registers and common enables supplied by enable latches. One address register, and enable latch is controlled by each line request logic circuit to establish connections from a line request logic's associated link to one of four lines to attached ports. If line request logic 6 sets a value of 2 in its address register and turns on its enable latch, a connection will exist between link 6 and line 2.

FIG. 7B shows the switch planes associated with a termination group 70. Eight links are switchable to one of four lines to ports under control of eight 2-bit addresses and eight enables as previously described. The reverse control plane of the eight links to intermediate groups 60 are OR'ed with eight "Rev Out Data" lines before leaving the group. Each of the eight reverse out data lines is generated by a line request logic circuit 702 which uses its line for the purpose of transmitting connection information to the port originating the connection. Connection information transmitted from the terminating group 70 consists of a connection verification pulse followed by busy indications with positive or negative status or a relocate address time multiplexed.

Referring to FIG. 8A, line request logic 702 for link X, the input "Forward Control In X" is the forward control link from intermediate group X to the terminating group switch matrix 705. The link is monitored by the line request logic 702 for busy indications and connection information from the originating port. Waveform 115 in FIG. 11 is the information received on this link. The first pulse received during the last part of the S portion of time slot two (the remainder of the terminating group address pulse) causes the busy latch 801 to set, initiating a cycle counter in control circuit 802, causing it to generate a connection verification pulse during the C portion of time slot 2 followed by busy indications, i.e. waveform 116 of FIG. 11. From this time until the end of the connection, busy latch 801 remains set by busy indications gated into the latch during each S time. Failure to receive a pulse during S time causes the latch to reset, i.e. restoring line request logic 702 to an idle state.

Figure 14:
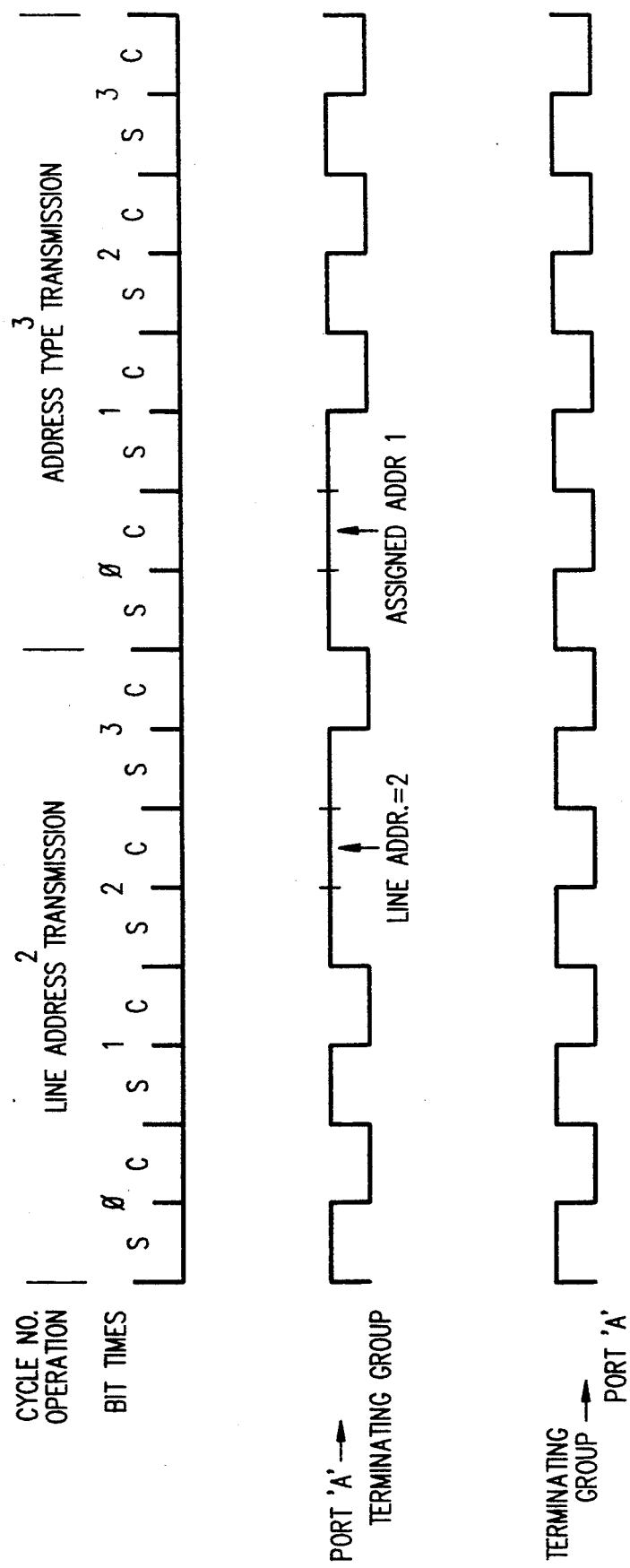
FIG. 14 is a time diagram of control signals transmitted between an originating port and the terminating switch group in the system of FIG. 2A.

The cycle counter in control circuit 802 steps at the beginning of each time slot 0. At this point, no further action is taken by the line request logic 702 until the cycle counter steps indicating the beginning of the "Line Address Transmission" cycle. FIG. 14 shows the "Line Address" and "Address Type Transmission" cycles. Since the originating and intermediate groups, 50 and 60, respectively, are transparent, only the transmissions between the originating port 301 and terminating group 70 are shown.

A binary clock running in synchronism with the transmission time slots is provided to address register 803 as the data input. A load line to the register is developed by control circuit 802 during the line address cycle when a C pulse, i.e. a pulse during the C portion of a time slot, is received from originating port 301. In the case shown in FIG. 14, the pulse is received during time slot 2 causing the address register to be loaded with a value equal to 2, which is the line address.

At the beginning of the next time slot 0, cycle counter in central circuit 802 advances to indicate the "Address Type Transmission" cycle.

During this cycle the control circuit 802 activates the clock line of the Assigned/Current address latch 804 at time C of time slot 0. If the address used by the originating port in making the connection was user-supplied, the port will transmit an up level during the C portion of time slot 0 causing latch 804 to set indicating assigned address as the address qualifier. During the last half of the address type cycle, a request for relocate information is made by control circuit 802 if the latch 804 is set. The request is directed to the appropriate line status logic circuit 702 by decoder circuit 805 which is controlled by address register 803 containing the line address. A time multiplexed two-bit response is received from the line status logic 703 over the "Response X" line and is loaded into two latches, 806 and 807, by control circuit 802. Latch 806 is set if the line status logic 703 returns no response, indicating that it is busy responding to a higher priority request This condition is equivalent to an actual line busy and is described elsewhere in this specification. If line status logic 703 responds, the line busy latch 806 is not set and the Relocate latch 807 is set if relocation is active for the addressed line. This completes the address type transmission cycle. As mentioned previously, if the A/C latch 704 is not set, no request for relocate information is made since a current address cannot be relocated. It should be noted that a current address is one supplied during a connection to a relocated line.

Figure 15:
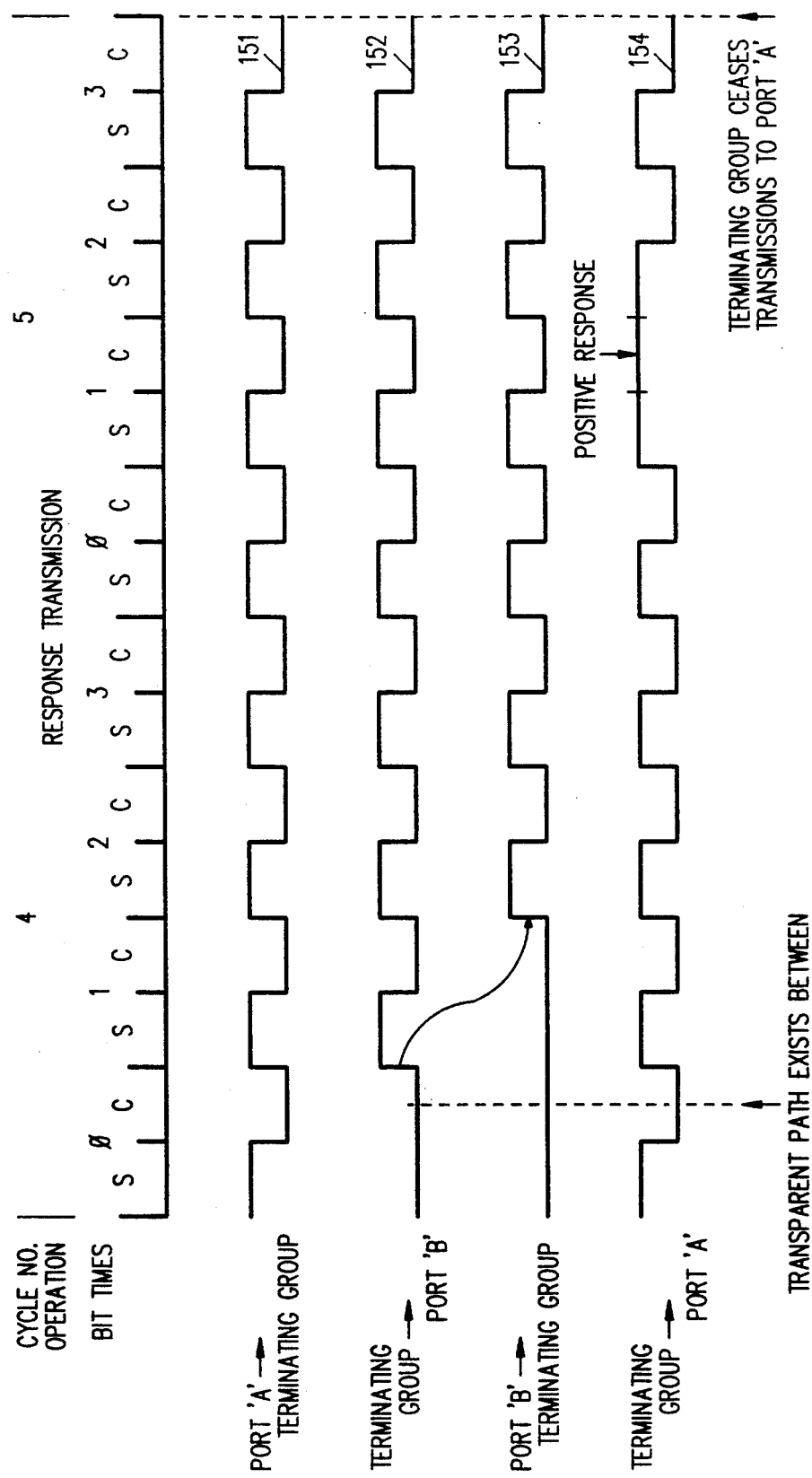
FIG. 15 is a timing diagram of control signals transmitted to an originating port during the connection process in the system of FIG. 2A.

FIG. 15 shows the "Response Transmission" cycles during which the line request logic 702 transmits information to an originating port 301, indicating the result of the connection request. Again, these cycles are defined by the stepping of the cycle counter in control circuit 802. Transmissions between terminating group 70 and terminating port 30 (port B) are now included with originating port 30 (port A), and terminating group 70 waveforms, since they begin during response transmission cycles. At this point, three different conditions can exist in the connection, resulting in three different actions. The conditions are relocate, line-busy and line-idle (connection to be established). The three will be described separately in that order.

If line busy latch 806 was not set and relocate latch 807 was set during the previous cycle, control circuit 802 initiates a relocate operation. A relocate address is transmitted from the status logic 703, which was previously interrogated for relocate information. The transmission is a serial four bit word transmitted during the C portions of the first four time slots of the response transmission cycles. Control circuit 802 receives this transmission and multiplexes it between S pulses of the busy indication transmission over the "Rev Out Data" line to switch matrix 705. As mentioned previously all transmissions from the terminating group 70 to the originating port 301 are made over the "Rev Out Data" line.

Time slots 0 and 1 of the second half of the response transmission are used to transmit the busy, idle or relocate status to originating port 301. A pulse in the C portion of time slot 0 indicates busy (no connection is made.) A pulse in the C portion of time slot 1 indicates not busy (a connection is established). No pulse during either time slots C portion indicates the first four time slots of the response transmission contained a relocate address. So in this case no "status pulses" are sent. Originating ports 301 always receive the first four bits of the response transmission and assume it is a relocate address until the status pulses are received. If a busy or not busy is received the relocate address received by the port is ignored. If no status pulses are received a relocate is active and the received address is used in setting up a subsequent connection.

After the status pulse transmission time slots, control circuit 802 ceases busy indication transmission and resets. This causes the existing relocated connection to be broken and completes the function of the terminating group for the connection.

The next possible condition to be described is busy. A busy condition can occur two ways. If the line busy latch is set as a result of a request for relocate information a busy condition exists. If line busy latch 806 is not set and relocate latch 807 is not set as the result of a request for relocate information or if relocate information is not requested as a result of a connection being made with a current address, a request for connection is made to the appropriate line status logic circuit 703. The request may result in the second type of line busy condition if the line to which the request for connection is made is, in fact, busy. The two types of busy will be described separately.

If a request for relocate information results in line busy latch 806 being set, the control logic 802 continues to transmit busy indications during the first half of the response transmission cycles. The second half of the cycles will contain a pulse during the C portion of time slot 0 indicating a busy condition (negative response) to the originating port 301. Control circuit 802 then ceases busy indication transmission and resets. This breaks the connection and completes the function of the terminating group 70 in the connection attempt.

If a request for relocate information results in neither the relocate latch 807 nor busy latch 806 being set, or if no request is made, a request for connection is then made to the appropriate line status logic circuit 703. This request is directed under control of address register 803 in the same manner as a request for relocate information. The request is made during the first two time slots of the first response transmission cycle. A response pulse is received on the "Response X" line if the addressed line is not busy and no higher priority request for connection is being made simultaneously. The pulse or absence of a pulse is presented to the line busy latch 806 through invertor 808 and is clocked into the latch by control circuit 802. Thus, if a pulse is received line busy latch 806 is not set and, if a pulse is not received, the latch is set.

In this case, the response pulse is not received and busy latch 806 is set. The action of control circuit 802 is now identical to the previous busy case. A pulse in the C portion of time slot 0 in the second response transmission cycle indicating busy to the originating port 301 is transmitted. This is followed by the ceasing of busy indications and the resetting of control circuit 802, thus breaking the connection and completing the function of terminating group 70 in the connection attempt.

The last case to consider is the no relocate, not busy condition which results in a connection. The waveforms in FIG. 15 show this case. As previously mentioned, if a request for relocate information results in no relocate and not busy, or if no request for relocate is made, a request for connection is made. This request results in a response pulse being received which causes line busy latch 806 not to be set if the addressed line is in fact not busy and no contention exists The request for connection has already been described and in this case results in line busy latch 806 not being set.

Since line busy latch 806 is not set, control circuit 802 activates "Enable X" during the C portion of the first time slot of the response transmission cycle. Address register 803 was previously set with the line address which is presented to terminating group switch matrices 705 over the line request logic's "Addr X" lines Thus, upon activating the enable line, line request logic 702 has established a connection between the originating port 301 (port A) and the terminating port 301 (port B). Port B receives the busy indications from port A through the terminating group connection at this point. See FIG. 15, waveform 152. Port B interprets this as an incoming connection and responds by sending busy indications to port A, i.e. waveform 153. Port B's busy indications are OR'd temporarily with the remainder of the line request logics transmission to port A. See OR circuit 706 in FIG. 7B.

A pulse during the C portion of time slot 1 (positive response) is transmitted to originating port 301 during the last half of the response transmission cycles, i.e. waveform 154. This indicates to port A that port B was not busy and has been connected to. At the end of the response cycles the line request logic 702 ceases all transmissions and only monitors busy indications from port A. The function of terminating group 70 in setting up the connection is now complete. When busy indications from port A cease, busy latch 801, FIG. 8A, will reset causing control circuit 802 to reset to deactivate the "Enable X" line, which breaks the connection.

Figure 16:
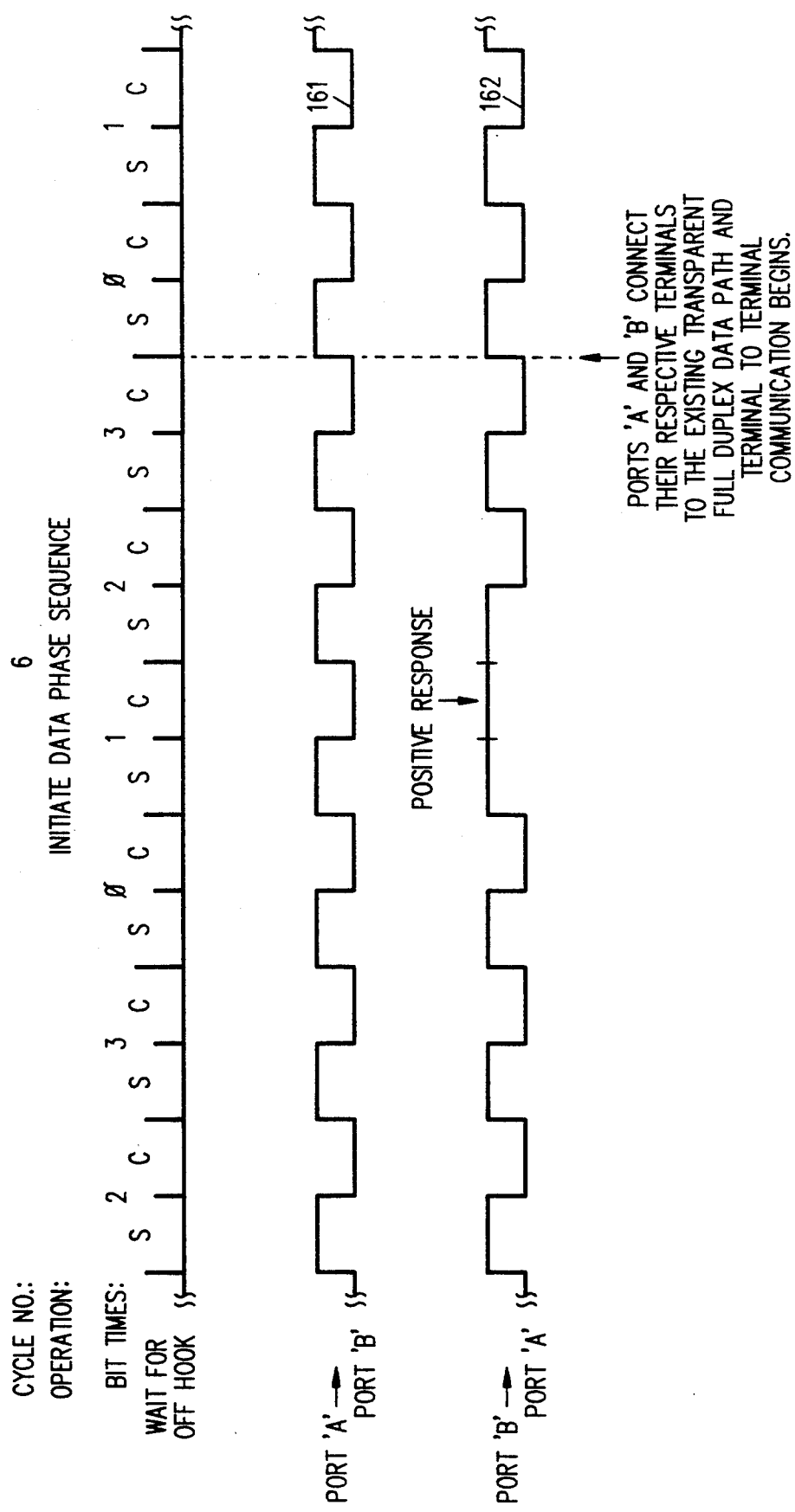
FIG. 16 is a timing diagram of control signals transmitted between originating and terminating ports after connection is made in the system of FIG. 2A.

At this point, both ports know they are involved in a connection, but the attached devices may need to communicate before data can be exchanged through the switch connection. Assuming the devices are telephones, upon receiving busy indications, port B, FIG. 15, waveform 153, would cause its telephone to start ringing. When port A receives the positive response status pulse, i.e. waveform 154, it would send a ringback tone to its telephone. At this point, the ports would not want their attached telephones to communicate. However, then port B's telephone is answered port B could send positive response status pulse 162 to port A indicating a desire to communicate, see FIG. 16. Port A would stop the ringback tone to its telephone and both ports would then connect their telephones to the data planes of the established connection. This example demonstrates the use of the control planes of switch 101 once a connection is established. Such use is a function of the ports, and not the switch groups, and its exact form is determined by user device requirements.

The operation of line status logic 703 in response to line request logic 0 relocate information and connection requests will now be described with reference to FIG. 8B. Each line status logic circuit 703 has eight "Request" input lines, one from each line request logic circuit 702. These lines are inputs to priority encoder 710 that generates a 3-bit "Requestor Addr" and line indicating a request is present. Request inputs 0 through 7 from line request logic circuits 0 through 7 are connected to priority inputs 0 through 7 which generates addresses with binary values of 0 through 7 respectively. Decoders 711 and 712 use the generated requestor addresses 0 through 7 to direct responses and relocate addresses to "OR" circuits 0 through 7 (FIG. 7A) and therefore to line request logic circuits 0 through 7 respectively. In this manner responses are directed to the requesting line request logic circuit only.

The "Relocate Addr X" and "Relocate Lth X" lines come from the bus I. F. logic 701. If relocate is active for the line associated with line status logic circuit 703, its relocate latch line will also be active. In addition, the relocate addr line contains a bit serial representation of the relocate address in the form required for ultimate transmission to the originating port 301. The serial address is repeated continuously so it is available every time slot cycle.

Requests received by the line status logic 701 are either requests-for-relocate information or requests-for-connection. Requests-for-relocate information always occur during time slots 2 and 3 of a given cycle. Requests-for-connection always occur during time slots 0 and 1 of a given cycle. Thus, the requests being received on the same set of lines are differentiated according to the time they are received. The relocate information request will be described first.

A pulse is received from a line request logic 702 on request line X of a status logic circuit 703 during time slots 2 and 3. Control circuit 713 generates a gate to encoder 710 during the C portion of time slot 2 if the relocate latch line is active. It also generates a gate during the S portion of time slot 3. Each time a gate is generated to encode 710, an address and request present line are generated causing decoder 711 to send a pulse to the requesting line request logic circuit 702. These pulses cause relocate latch 807 in line request logic 702 to set if a relocate is active and cause busy latch 806 not to be set. If relocate was not active, the operation of the line status logic 702 is complete.

The outputs of encoder 710 during the request cause the requestor address to be stored in latched decoder 712. If relocate was active during the request, the relocate latch 807 in the requesting line request logic 702 is set, causing line request logic 702 to transmit the information present on its response line to originating port 301 during the C portions of the following time slots 0 through 3. It is the function of line status logic 703 to provide the bit serial relocate address in proper form during these time slots on the response line to line request logic 702.

Control circuit 713 accomplishes this by gating 712, thus directing the "relocate address present on the Relocate Addr X" line to the requesting line request logic 702 whose address is stored in decoder 712. This completes the operation of the status logic for relocate information requests Control circuit 713 does not activate the gate to encoder 710 during time slots 2 and 3 of a relocate transmission cycle. If line request logic circuit 702 makes a request for relocate information at this time, it receives no response which it interprets as a busy condition. During time slots 0 and 1 of a relocate transmission, a response to requests for connection can be provided since decoder 711 is used to direct the response. Note however, the outputs of encoder 710 in this case will not disturb the address in decoder 712, since the "Xmit Relocate Addr" which gates the relocate address also blocks the load line of decoder 712.

The busy-idle status of the line associated with line status logic circuit 703 is reflected in the state of the "Line X Busy" latch 714. Latch 714 is set when busy indications are received from the terminating port over the reverse control line by "AND" circuit 715. If busy indications are not present, circuits 716 and 717 will cause latch 714 to reset.

As described elsewhere, when a port 301 originates a connection, it may also transmit busy indications to its terminating group 70, thus setting a busy latch 714 in the associated line status logic circuit 703 which prevents incoming connections. Upon completion of the connection, busy indications would cease, reset busy latch 714 and allow incoming connections once again. Busy latch 714 can also be set by control circuit 713 as the result of a request for connection. Once set, however, it must be maintained by busy indications from the terminating port 301. These indications start during the request for connection when line request logic 702 receives a not-busy response, enables the terminating group 70 connection, thus signaling the terminating port 301 a connection is being made to it. The port responds with busy indications which maintain busy latch 714 set condition until they cease signaling the end of the connection Busy latch 714 being reset allows subsequent connections to be made.

A request for connection consists of a pulse during time slots 0 and 1 of a cycle. Encoder 710 and decoder 711 function in the same manner as that described for a request-for-relocate information. Thus, a response pulse is directed to the requesting line request logic circuit 702 when the gate line of encoder 710 is activated.

Control circuit 713 activates the gate line during the C portion of time slot 0 and the S portion of time slot 1 if busy latch 714 is not set. Therefore, if the line request logic 702 receives a response pulse, its busy latch 714 is not set and it enables its connection. In this case, control circuit 713 would set busy latch 714 at the end of the request pulse so that subsequent requests for connection would encounter a busy condition. A line request logic circuit 702 that receives no response pulse when making a request for connection sets its busy latch 714. This is the result of a previous connection being made to the line, the line being busy due to the associated port originating another connection (when this mode of operation is desirable) or a higher priority request being received simultaneously.

Figure 17:
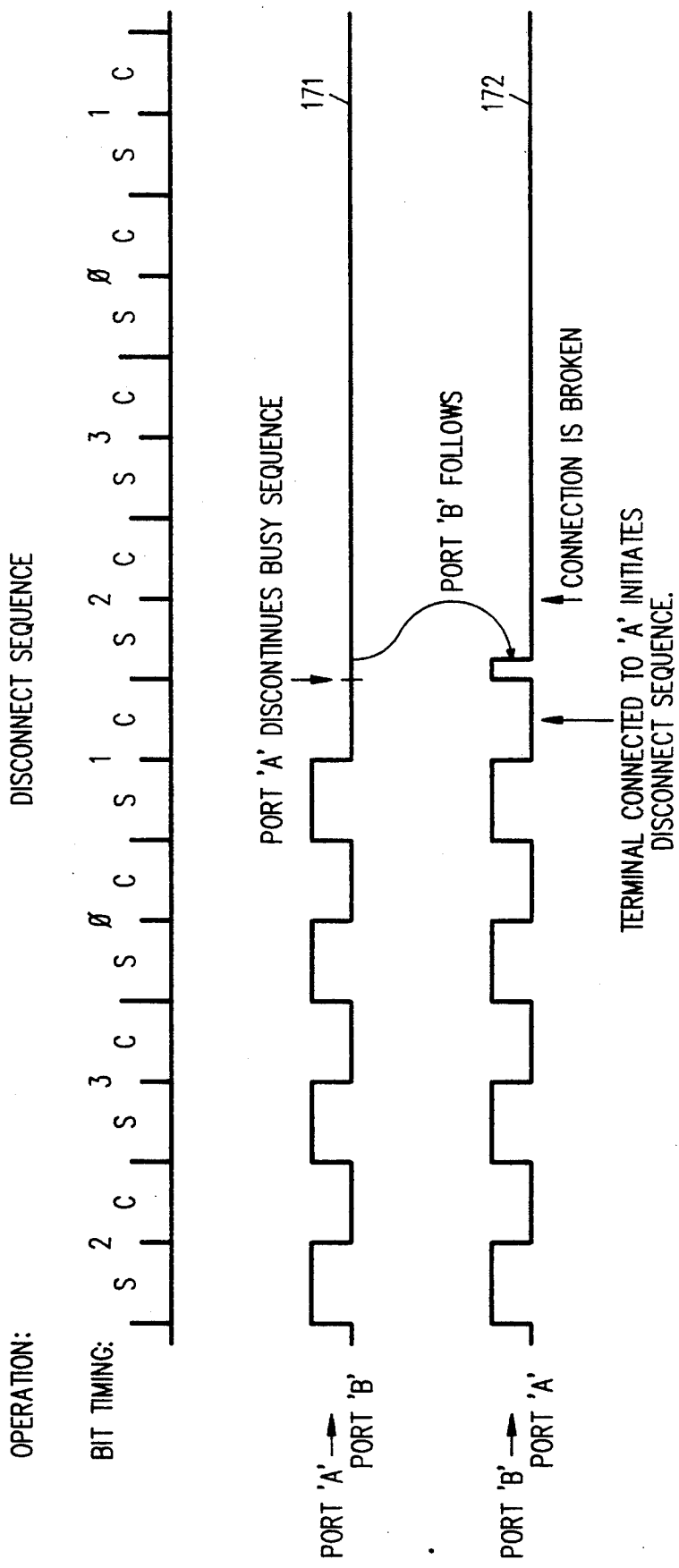
FIG. 17 is a timing diagram of busy control signal transmitted between originating and terminating ports in the system of FIG. 2A.

FIG. 17 shows the busy sequences transmitted between originating and terminating ports 301, port A and port B, respectively. These sequences are monitored by those stages of switching involved in a connection and as long as they continue the connection path is maintained. Each port, in addition to transmitting its own sequence, monitors the sequence generated by the other. During the connection set up, terminating group line request logic also participates in sequence generation until the connection attempt is terminated or the terminating port begins transmitting its sequence.

The sequence consists of pulses during the S portion of each time slot. The C portion is reserved for connection information transmission A port will cease transmitting its sequence when its attached user indicates a desire to break the connection. See FIG. 17, waveform 171. The ports monitor busy indication during the first half of S time and truncate their own busy sequence immediately upon detecting the absence of a received sequence. See FIG. 17, waveform 172.

The switch groups 50, 60 and 70 monitor busy indications during the last half of S time and disable their connections immediately when busy indications are no longer detected.

Therefore, FIG. 17 shows port A initiating a disconnection, port B following and at the end of the S portion of the time slot, all connections in the associated switch path being disabled. All links and the involved ports are now free for other connections.

In the process of setting up a connection in switch 101, actions are initiated which result in a response if the result is successful or no response otherwise. No response indicates the failure of the switch to respond in the desired manner and is the result of simultaneous request to a single circuit for a given action. One type of request for action is the transmission of a terminating group address by an originating port. This is a request for a connection through the originating and intermediate switch groups 50 and 60, respectively, to the addressed terminating group 70. If the action is carried out successfully, a connection verification pulse is received by the originating port 301 from the addressed terminating group 70. If contention was encountered from a higher priority request in either the originating or intermediate groups the connection is not established and no verification pulse is received. The originating port would then break the partial connection by failing to initiate a busy indication sequence and retry the connection during the next time slot cycle. This type of contention is referred to as link contention, since it involves the selection of links to create a switch path.

The second type of contention occurs within a terminating group 70, and involves the line request logic requests to the line status circuits. A request for relocate information or a request for connection can be made from separate line request logic circuits 702 within a terminating group 70 to the same line status logic circuit 703 simultaneously. This results in what is called status logic contention. This type of contention differs from link contention in that no retry is required.

Contention for relocate information implies a line-busy condition, since a higher priority request is either about to make a connection or be relocated to a new location where it will make a connection In any case a connection will be established to the desired line by the higher priority requestor making the line busy. Contention for a connection implies a busy condition for the lower priority requestor also since a connection to the desired line is about to be made. Thus, an originating port 301 receives a line busy response to its connection attempt when status logic contention is encountered.

Referring again to FIG. 5, requests for connection from originating ports 301 in the form of terminating group address pulses are received in the originating group encoder circuit 504. Priority encoder 504 has four input lines 0 through 3. If input line X is activated a binary value equal to X is generated as an output and a connection from line X to an intermediate group 60 is established. If simultaneous pulses are received by circuit 504, only the lowest order line is considered Therefore, a connection is established only from the lowest order requesting line to an intermediate group 60. The other request(s) are ignored and result in the respective ports 301 receiving no verification pulse. Contention is assumed by the ports and retry connection attempts are made. Contention exists in the primary stage of switching only if one or more ports on the same originating group 50 originate connections to the same terminating group 70 during the same cycle of time slots. These are the conditions necessary to cause a priority encoder to receive simultaneous pulses. If several ports on the same originating group 50 originate connections during the same cycle to different terminating groups 70, no contention would exist since the request pulses (terminating group address pulses) would occur during different time slots of the cycle. This is possible since originating group 50 connections are set up in a fraction of a time slot allowing the logic to establish connections at a rate of one each time slot.

With reference again to FIG. 6, requests for connection are received by the intermediate groups 60 in the form of partial terminating group address pulses passed through newly established originating group connections from originating ports on different originating groups 50. The originating groups are different because each group has only one link to any given intermediate group 60. The pulses are received by priority encoder 606 which operates in the same manner as the previously described originating group encoder 504. Thus, if more than one pulse is received, only a connection for the lowest order requestor is established. The request(s) on other links are ignored so that the associated ports will receive no connection verification pulse again indicating contention was encountered. Therefore, for contention to exist in an intermediate group, two or more ports on different originating groups must originate connections to the same terminating group 70 during the same cycle. Additionally, in order for the same intermediate group 60 to be selected by the involved originating groups, it must be the lowest order intermediate group having available links to both the addressed terminating group and to all involved originating groups.

Figure 8B:
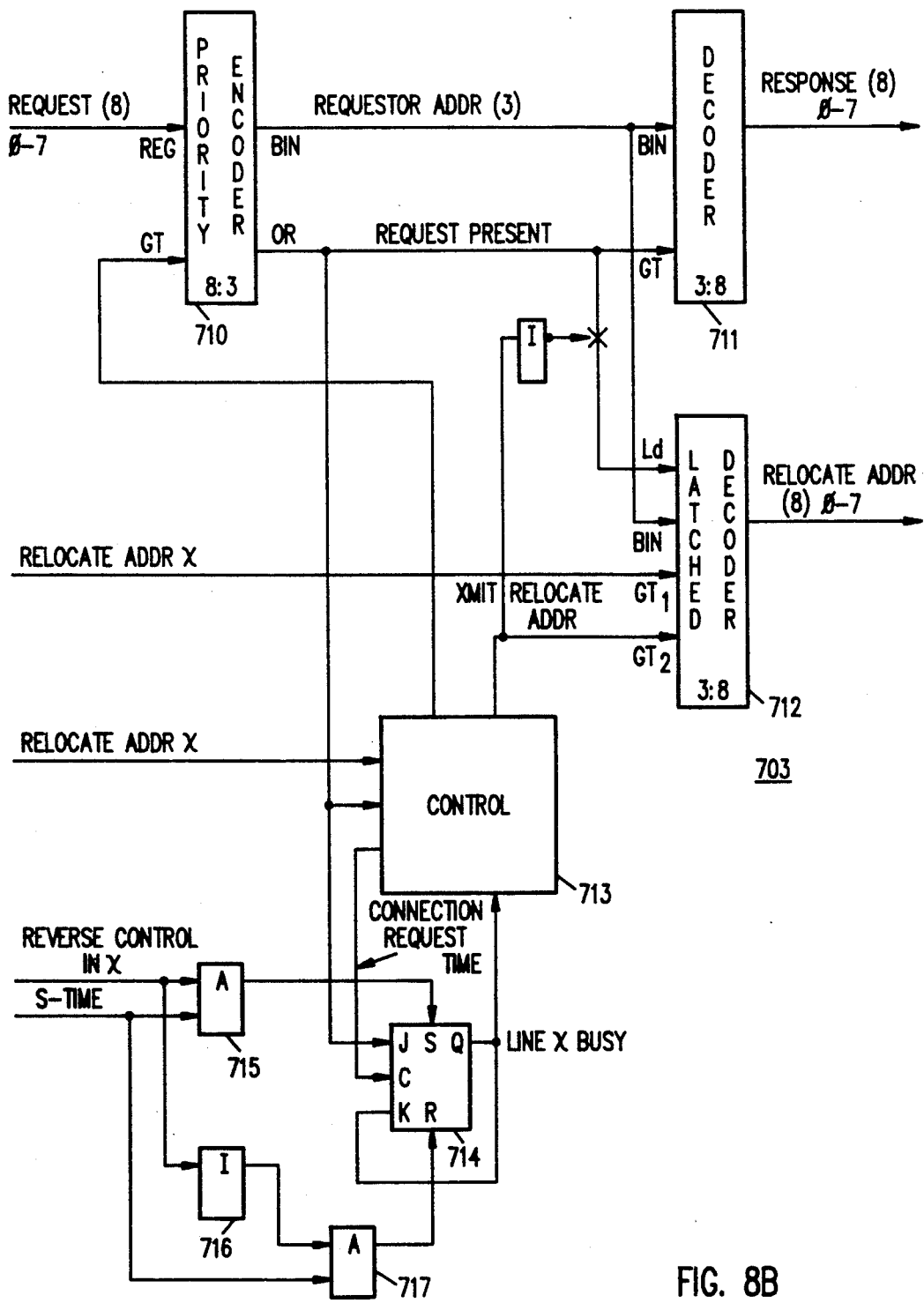
FIG. 8B is a block diagram of the line status logic used in the terminating switch group of FIGS. 7A and 7B.

As shown in FIG. 8B, requests for relocate information are received by priority encoder 710 which generates an address equal to the line number of the active input This address is used to direct responses back to the requesting circuit. If more than one input is active, encoder 710 will generate an address equal to the lowest order active line number. Thus, responses will be directed to only the lowest order requestor when multiple requests are received. The other requestors will receive no response which is interpreted as a busy condition as previously described.

When a request for relocate information results in a relocate address transmission, no response requests for relocate information will be provided for the duration of the transmission. Again, the lack of response is interpreted as a busy to the ignored requestors.

In every case of status logic contention, a higher priority requestor is about to make a connection attempt to or be relocated to the addressed line. Therefore, a retry connection is not necessary since the line in question is either busy or will be busy. Thus, it is sufficient to respond to such contention situations with a busy condition.

Figure 2B:
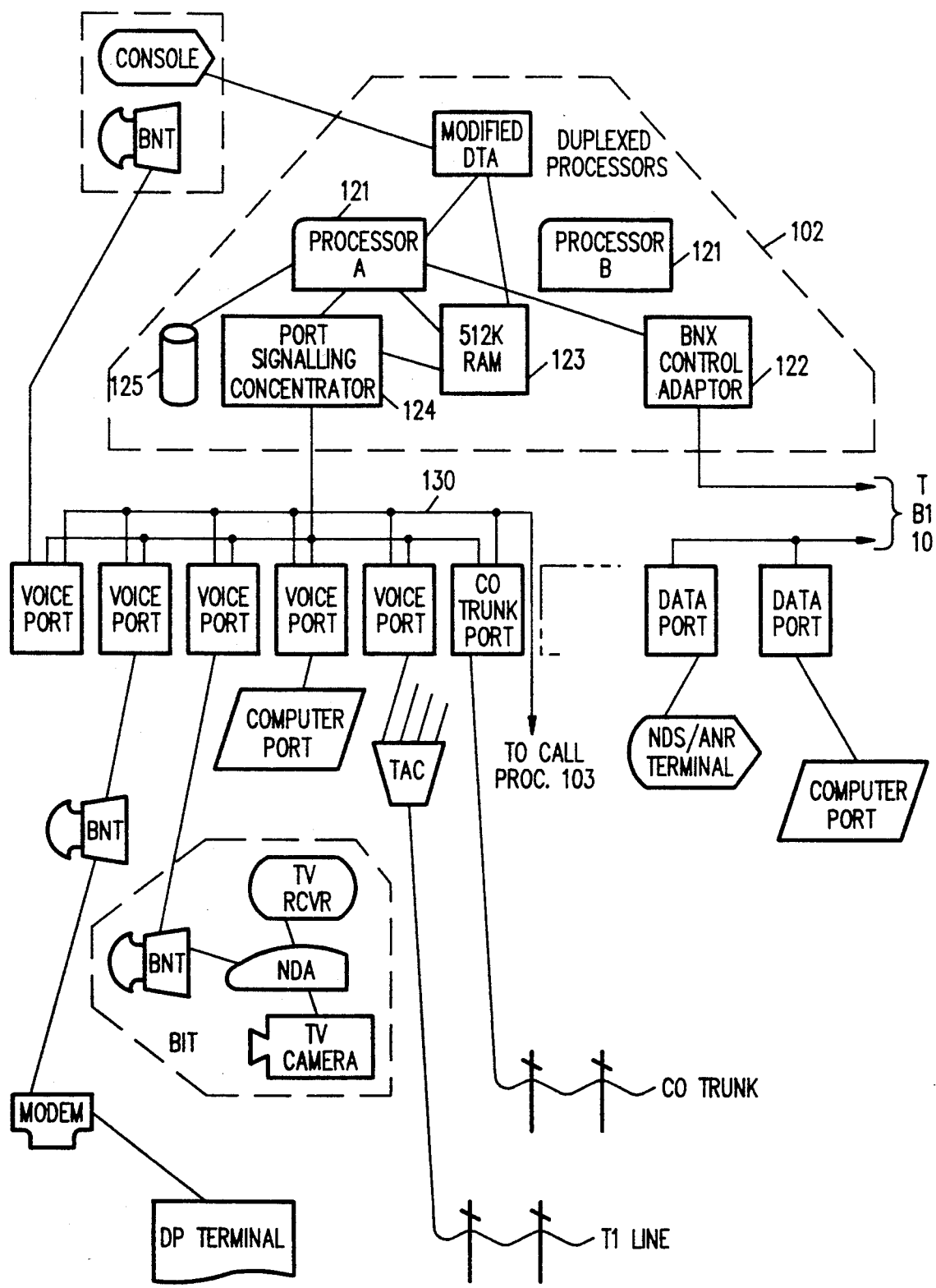
FIG. 2B is a block diagram of a BNX controller used in the system of FIG. 2A.

Referring now to FIGS. 2A and 2B, BNX controller 102 may comprise duplexed processors 121(A and B), 512 K-bytes of RAM 123, disk drive 125 for program initiation and directory backup, port signalling (i.e. control signals) concentrator 124 and BNX adapter 122. Either section of the processor consists of a microprocessor, such as one of the MC68000 family manufactured by Motorola, Inc., six serial DMA channels for port signalling via the concentrator, plus buffers, transceivers and miscellaneous logic. Both sections of the processor are driven by the same clock so that the one in reserve can immediately assume the load when the other detects an internal failure. They present a common interface to the rest of controller 102.

Signalling for data ports is provided by BNX controller 102 via bus 120, and signalling for voice ports is provided by telephone call processor 103 (hereafter also processor 103) via bus 130. Port signalling concentrator 124 may be used to provide means for each port's signalling facility (if not the same as voice or data) to present a service request by interrupting the processor. It also provides a bidirectional serial path between each port and one of the DMA channels into RAM. This path provides signalling communications between a port and the processor and is independent of the switching matrix. Processor 121 can initiate communication to any port or a port can be the initiator via interrupt. At a given instant, the processor can be in communication with only one port per DMA channel.

BNX control adaptor 122 may be similar to the IBM Digital Data exchange (DDX) described more fully in the "IBM Journal of Research and Development", Vol. 28, Number 4, July, 1984, pp. 444-453, which is incorporated by reference as if fully set forth herein. It permits the processor to establish connection between two ports through the BNX, to test the efficiency of the connection and to verify available connection routes. All adaptors, the DMA controllers, port signalling concentrators and matrix control, appear to processor 121 as memory-mapped I/O.

As stated elsewhere in this specification, the function of processor 103 for voice is analogous to the function of BNX controller 102 for data. Thus, processor 103 comprises a microprocessor-based configuration similar to that of BNX controller 102. Since such controllers are well known to those skilled in the art, detail description is not required in this specification.

With continuing reference to FIG. 2A, data exchange controller 110 comprises a well-known store-and-forward message exchange which can be implemented by commonly available computer systems. Data exchange controller 110 provides interconnection to packet switching systems by which signal routing functions for BNX 101 are performed.

Switch ports 302 to 307 comprise hardware facilities for which communication pathways are established through BNX 101. Most ports, which are coupled to port logic 301, are attached through the distribution frames to communication devices external to BNX 101. It is the communications to and from such external devices that are actually switched in the BNX. As noted earlier and shown in FIG. 2B, most ports also include direct signalling lines to BNX controller 102 and processor 103. There are several types of switch ports.

The most common type of port is voice port 302. It attaches a line from a BNT 106 which is typically a single balanced twisted pair, common in all telephone networks. It transmits and receives digital pulse data at 32 K-bps, simultaneously in both directions by means of digital hybrids. These data are arrayed in packets of up to 64 bytes each. Each packet is identified as to data type-encoded voice, data, control or silence (a packet of silence contains, besides its identifier, only the count of silent byte times). Voice, data and silence packets are sent only after a bona fide connection through BNX 101 has been established. They are intended for reception only by another port. Control packets pass between the BNT and telephone call processor 103 freely in the absence of a BNX connection, during silences once a connection is made. A control packet is not accorded "real time" status. It has lower priority in use of the line and is capable of being interrupted by a voice or data packet, with later resumption. In regard to control packets, the port has the responsibility of interrupting the processor 103 for those coming in asynchronously to request service. It then accepts conditioning by the processor 103 to detect silences in the transmit datastream for insertion of processor outbound data, and to distinguish inbound control packets Voice and data packets are further described in the section on the BNT.

PC port 304 attaches an external line that provides telecommunications interface for PC 104. The connection is bidirectional. Port 304 has no signalling path to controller 102. The principal users of data ports are expected to be NDS and ANR displays which use half duplex protocols. Full duplex devices that use separate communication lines for each direction can be accommodated.

Interfaces 111 and 112 are the most complex and expensive. They are responsible for matching signal and function to attached lines from a public network central office (CO), one line per port. At the present time, all signalling over such a line is standardized. For incoming calls (trunk "seizures" by the CO), interface 111 accommodates all control signals from the CO, including battery reversal", dial pulsing and DTMF (touchtones). It converts voice, once a connection is made through the switch matrix, between analog and the internal 32-Kbps DPCM. For outgoing calls the port signals the remote CO by the same protocols, generating DTMF for calling number redial or dial pulses if the CO is not equipped for DTMF. Speech is again converted between analog and digital. The interface recognizes "glare" in trunk seizure and by communication with processor 103 on its signalling path arranges to have its outgoing call retried from another trunk. Incoming calls require generation of ringing tones and busy tones (the latter can be substituted by a voice synthesized camp-on announcement if desired before the connection is established. A single ringing or busy tone generator provides this service for all CO trunks by special parallel connection. Both two wire and four wire trunk lines are supported. Similar functions are provided by interface 112 for ISDN where available.

Other types of ports also include a conference ports, which is a special voice port with as many paired appearances on the BNX as the maximum number of participants the user wishes to allow in a conference. It does not attach to any device external to BNX 101. Processor 103 switches all conferring ports to the conference port, which mixes voice packets according to a "seizure" protocol in which the first voice packet to arrive is transmitted in its entirety on the outgoing sides of all pairs, after which the conference port waits to detect the start of another voice packet from any incoming side, which then seizes the transmitter. Arriving packets that begin while another is being transmitted are entirely ignored. Simultaneous starts are resolved at random by a circularly scanning packet start detector. Signalling flow between processor 103 and a conference port is all controller-initiated, relative to port switch-in or switch-out. A conference port may not interrupt the controller.

The technology and design for switch ports 302 to 307 and interfaces 111 and 112 are well-known and well-documented in the prior art. Therefore, the specific design and implementation of switch ports 302 to 307 and interfaces 111 and 112 do not form a part of the present invention.

B. Telephony and Graphics

Figure 18A:
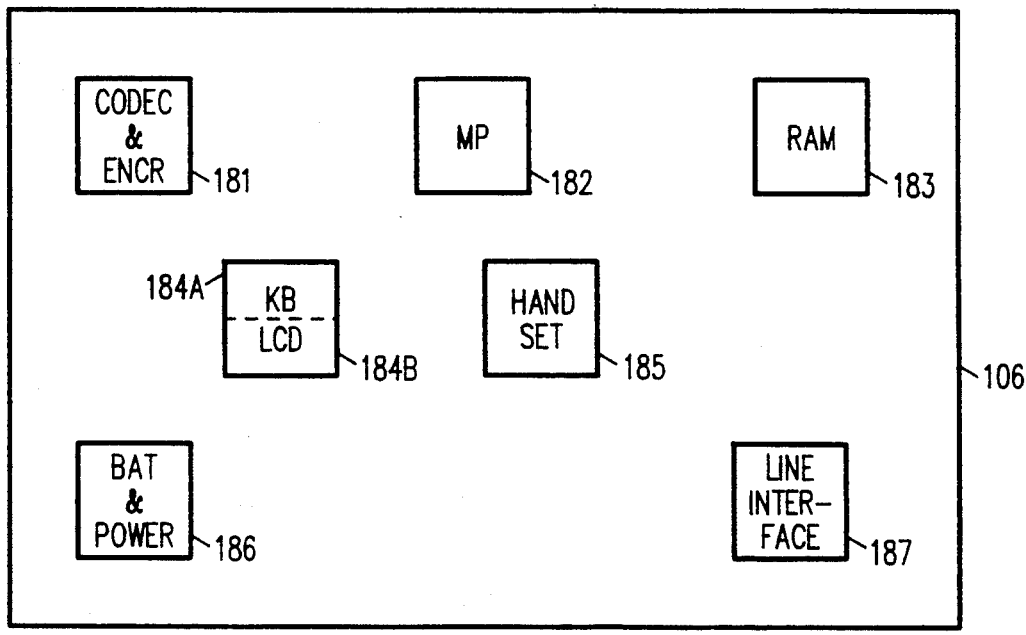
FIG. 18A is a block diagram of a user instrument constructed according the principles of the present invention.
Figure 18B:
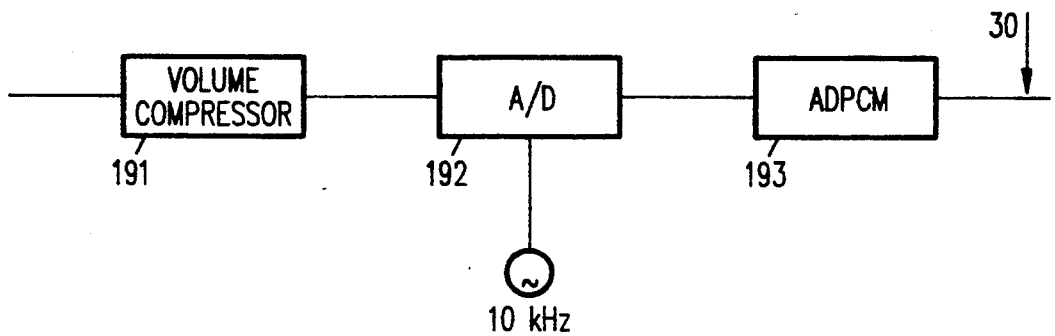
FIG. 18B is a block diagram of the speech encoder used in the user instrument of FIG. 18A.

Referring to FIGS. 18A and 18B, BNT 106 is essentially an ordinary telephone, consisting of a high quality transmit-receive handset 185, an acoustic horn speakerphone for hands-off use, keyboard 184A comprising, the usual telephone twelve key pad plus eight additional keys, 20-character liquid crystal display (LCD) 184B, and connectors for an optional native data attachment (NDA) and one modem attachment for a user supplied low speed data device (up to 19,200 Baud). BNT 106 is powered from the AC mains by a typical calculator recharger (backed up by an internal nicad battery) 186 sufficient for several hours of unpowered operation, and is ready for fiber optics use when available.

Internally, BNT 106 incorporates several low power semiconductor chips including CODEC 181 for voice encoding/decoding and optionally encryption and decryption, microprocessor 182, RAM 183 and telephone line interface 187. As shown in FIG. 18B, voice signals are compressed by volume compressor 191 and converted from analog signals to three-bit differential pulse code modulation, sampled at a 10K Hz rate by A/D converter 192 and ADPCM module 193. ECC module 194 generates 2K bits/sec for error correction. The resulting 32K bits/sec digital information signals are transmitted to BNX 101 in packets of up to 64 bytes each.

The information in a voice packet may be encrypted before transmission and decrypted upon reception Silences are indicated by a second packet type. A third packet type, called a "control" packet, is passed between the BNT microprocessor 182 and call processor 103. The special nature of control packets has already been described. They are used principally for altering the status of the BNT in relation to the BNX, for communicating user keyed requests such as called number hold, etc., and to provide data for LCD 184. A fourth packet type contains digital data derived from or destined to the NDA. Data from the modem connector is handled the same as voice data, once the user has conditioned BNT microprocessor 182 by key indication. Interfacing to BNX 101 through the twisted pair is obtained by a digital hybrid chip that provides full duplex packet flow at 32 K-Baud.

As noted for the preferred embodiment of the present invention, three-bit PCM is used which, in turn, may produce noticeable quantization noise. Such noise arises primarily in the presence of large amplitude input signals owing to sampling coarseness. While four-bit PCM eliminates quantization noise or substantially reduces such noise to below noticeable levels, such a PCM configuration severely impacts the transmission capacity of the proposed system. Therefore, quantization noise in the present system is controlled by volume compressor 191 which limits the amplitude of the signals processed by A/D converter 192. Compressor 191 may comprise a log/antilog amplifier, such as a Model No. 757 manufactured by Analog Devices Inc. The design and implementation of A/D converter 192, ADPCM module 193 and ECC module 194 are also well-known in the prior art and form no part of the present invention.

Since BNT 106 provides convenient digital signal interface, voice print personal identification and hands-off control can be optionally available in the BNT using well-known inexpensive hardware and software algorithms developed for voice print recognition.

The eight special keys on the BNT are used, with the standard twelve, to request and mediate special functions from BNX 101, including hold, call forwarding, transfer, automatic recall, etc., as well as the establishment of connections for data ports. Status of the BNT in regard to previous use of these keys is instantly recallable and displayable at the LCD.

To illustrate the simplicity and low cost of BNT 106, the optional NDA may comprise an enclosure similar in size to the console of the Radio Shack TRS-80 Model 1, manufactured by Tandy Corporation. It mounts an alphanumeric keyboard and provides screw-type connectors for 300 ohm ribbon cable to the antenna terminals of a standard (user supplied) NTSC television receiver, black and white or color, as well as a coax connector for a vidicon or CCD television camera. Internally, the NDA contains a power supply operating from the AC mains, a microprocessor with ROS and RAM, an MC6847 and MC1372 to drive the TV receiver, a binary conversion interface and frame buffer for the TV camera. Textual data can be displayed on the TV receiver in 16 lines of 32 characters each, graphic data in binary black and white or 8-hue color with resolution up to 256 bits/line, 192 lines.

Analog data from the TV camera is "squared up" into two-level binary, unencoded data, and mapped into a 512 by 512 bit memory array. The resulting 256 K-bit pictorial frame is passed through space compression before transmission, which reduces it typically to about 25 K-bits of information, allowing a frame transmission rate of better than one frame per second, which is more than adequate for remote chart presentation. Such a frame received by an NDA is stored in the same refresh RAM used by the MC6847. When such a frame is retrieved, it is passed through space expansion before presentation to the MC1372 for display.

All functions of BNX 101 are controlled largely by means of software in BNX controller 102, call processor 103, and the BNT and NDA processors. Its basic function is to establish and terminate connections through the BNX. Many factors, both dynamic and static, influence this operation. In the aggregate they constitute a large set of special functions and features which are given in Exhibit A hereto.

EXHIBIT A

Table I list special functions. Column A identifies that entity most responsible for executing the function listed in column B. "BIT" refers to code at the BNT or NDA processor; a number indicates BNX code and refers to the following section which describes that particular module.

TABLE I

ABCM: A-B Connection Module
CCL: Console Command Language

| Column A | Column B |
|---|---|
| ABCM | Barge in vs. Privacy |
| ABCM | Camp on (for CO trunk calls only) |
| ABCM + BIT | Call waiting notification |
| ABCM + BIT | Call attempted notification |
| ABCM | Call transfer ABCM Universal night answer |
| ABCM | Call pick up (by class mark) |
| BIT + ABCM | Specified call refusal (before attempted) |
| BIT + ABCM | "Do not disturb" (temporary "not here") |
| Call forwarding: | |
| BIT | On no answer or busy |
| BIT | Secretarial screening |
| ABCM | Paging and coded response |
| ABCM | Line hunting (circular and pilot number) |
| BIT | Busy test before transfer |
| ABCM | Automatic call distribution with recorded answer announcement unmanned position identification supervisor notification |
| BIT | Abbreviated dialing |
| ABCM | Hot lines |
| ABCM | Conference and consultation |
| BIT | Intercom |
| ABCM | Least cost trunk routing |
| ABCM | Restricted dialing (by class mark) |
| ABCM | Unlocking codes or passwords |
| ABCM | Data recording and billing |
| CCL | Traffic statistics: display and recording |
| ABCM | Queuing for trunk use |
| BIT + ABCM | Single digit group dial |
| ABCM | Class change with time of day |
| ABCM + CCL | Synthesized voice announcements |
| CCL | Busy verification |
| CCL | Status monitoring |
| CCL | Diagnostic requests |
| CCL | Trunk validation |
| CCL | Port busy-out |
| CCL | Remote testing |
| CCL + ABCM | Call intercept |
| CCL | Directory display and control |
| BIT | Single digit dial services (Hotel) |

The following four sections describe the major program modules incorporated into the BNX controller 101, including a summary of major functions for each. Minor functions are included within major ones.

BNX Controller 102

Controller 102 provides the following services for application modules listed below.

Attention Interrupt Handler- identifies a port interrupt request according to its directory entry and initiates an interrogation task; recognizes a console DTA interrupt and passes control to the console command language task;
General task initiation;
Timeout and real-time clock maintenance;
Task and I/O scheduling;
Queue/dequeue subroutines;
Statistical error recording.

I/O Drivers Modules

I/O driver modules provide adaptor-specialized services listed below for the supervisor and application modules, including error detection and retry, where appropriate. Their principal function is to simplify the parametric interface between adaptors and the applications. For most application tasks this means that the interface is at a "get/put" level; the task is suspended for that port while the I/O operation is in progress.

PBX Console Display Terminal Adaptor (DTA) performs key tracking for keyboard and screen writing via DMA setup.

A-B Connection Module (ABCM)

The ABCM is the major BNX code module. It performs many tasks and subtasks for checking and rerouting associated with information switching in a PBX, as listed below.
Source/destination and status match-logical connection validating, status change, BIT signalling control;
Destination-busy functions;
BNX connection-Set up and retry for busy-out;
Ring-through functions;
During-connection functions (usually results in invocation of other tasks);
Disconnect: recording and billing.
Console Command Language Module (CCL)
The CCL accepts, decodes and executes commands, listed below, from the BNX console operator, either at the BNT or the console.
System status display and alter;
Charges, statistics and traffic display, output and reset;
Diagnostic initiation and display (does not include actual diagnostic and maintenance programs);
Call intercept and paging functions;
Directory search, display and update;

In addition to functional resident programs in the BNX, additional code must be allocated for resident diagnostics, whose purpose is principally to exercise the ports and BITs automatically at timely intervals. Diagnostic and maintenance programs, residing on the floppy diskette for retrieval as needed through the BNX console, are also provided.

BNX Controller

The 512 K-bytes of RAM in BNX controller 102 contain the resident software comprising all of the above modules, plus a system directory. The system directory matches telephone and trunk numbers to ports and also contains all the dynamic and other static information relative to every port.

The system directory is a large table containing one entry for each port on BNX 101. Conference ports are represented by more than one entry. Table II is a list of fields contained in the entry for a voice port. Entries for other types of ports may contain less fields; a data port, for example, requires very few. Voice ports used in some applications, for example, hotel and motel, require more than those shown. The list of items, especially their order, is not necessarily comprehensive nor ideal. The number in column A is the bytes required for each field.

TABLE II

| Column A | Column B |
| --- | --- |
| 1 | Port type code |
| 8 | Identification code |
| 20 | User's name |
| 3 | Called number directory pointer |
| 3 | Port status |
| 6 | Hold queue root |
| 6 | Camped-on queue root |
| 3 | Class marks and restrictions |
| 6 | Time-of-day restriction change indicators |
| 8 | Password |
| 3 | Calling number directory pointer |
| 8 | Unlocking code |
| 6 | Connection time |
| 12 | Logical called number |
| 3 | Trunk queue forward pointer |
| 6 | Hold and camp-on forward pointers |
| 6 | Group association queue |
| 10 | Statistics counters |
| 8 | BNX attachment addresses |
| 32 | Signalling buffer |

Since additional requirements may be identified by the user, the typical entry length may be arbitrarily set at more bytes than listed.

I claim:

1. Apparatus for connecting an originating port to a receiving port in a communication system, said apparatus comprising:
    a distributed control switching matrix having a plurality of originating group submatrices, a plurality of intermediate group submatrices and a plurality of terminating group submatrices;
    said originating port transmitting a first control signal for selecting an originating group submatrix;
    said originating group submatrix selecting a path to a terminating group submatrix via an intermediate group submatrix in response to the combination of a second control signal produced by said intermediate group submatrix with said first control signal;
    said intermediate group submatrix selecting a path to the receiving port via a terminating group submatrix in response to the combination of a third control signal produced by said terminating group submatrix with said second control signal;
    said terminating group submatrix producing and transmitting a fourth control signal to said originating port which represents verification that connection form said originating port to said receiving port has been made.

2. A method for connecting an originating port to a receiving port in an integrated communications system having a distributed control switching matrix which includes a plurality of originating group submatrices, a plurality of intermediate group submatrices and a plurality of terminating group submatrices, said method comprising the steps of:

selecting an originating group submatrix in response to a first control signal;

producing a second control signal;

selecting a path to a terminating group submatrix via an intermediate group submatrix in response to the combination of said first and second control signals;

producing a third control signal;

selecting a path to the receiving port via a terminating group submatrix in response to the combination of said third control signal with said second control signal;

producing a fourth control signal representing verification that connection from said originating port to said receiving port has been made; and transmitting said fourth control signal to said originating port.

3. A high-capacity integrated communications system for establishing data and voice communication among computers connected to data ports, among telephones connected to voice ports, and between said computers and said telephones, said system comprising:

a switching matrix having a plurality of originating group submatrices, a plurality of intermediate submatrices and a plurality of terminating group submatrices;

an originating port for transmitting a first control signal for selecting an originating group submatrix;

a receiving port;

an originating group submatrix selecting a path to a terminating group submatrix via an intermediate group submatrix in response to the combination of a second control signal produced by said intermediate group submatrix with said first control signal;

said intermediate group submatrix selecting a path to the receiving port via a terminating group submatrix in response to the combination of a third control signal produced by said terminating group submatrix with said second control signal;

said terminating group submatrix producing and transmitting a fourth control signal to said originating port, which represents verification that connection from said originating port to said receiving port have been made;

a telephone call processor, coupled to the switching matrix, for producing voice control signals in response to signals representing interconnection requests received from said voice ports; and a switching matrix controller, coupled to the switching matrix, for producing control signals in response to signals representing interconnection requests received from said data ports and voice ports, said switching matrix being responsive to said control signals for establishing connections among computers.

4. An integrated communications system as in claim 3 wherein said telephone call processor establishes connection between voice ports and said switching matrix controller independent of said switching matrix.

5. An integrated communications system as in claim 3 wherein:

said telephone call processor produces video control signals in response to signals representing interconnection requests received from said voice ports; and said switching matrix is responsive to said video control signals for establishing video connections among telephones.

6. An integrated communications system as in claim 3 wherein said switching matrix is responsive to said control signals for establishing telephone-to-computer connections.

7. An integrated communications system as in claim 3 wherein said switching matrix is responsive to said voice control signals for establishing voice connections among telephones.

8. An integrated communications system as in claim 3 further including a data exchange controller for establishing interconnection with a packet switching system.

9. A high-capacity integrated communications system for establishing data and voice communication among computers connected to data ports, among telephones connected to voice ports, and between said computers and said telephones, said system comprising:

a distributed control switching matrix;

a telephone call processor, coupled to the distributed control switching matrix, for producing voice control signals in response to signals representing interconnection requests received from said voice ports; and a distributed control switching controller, coupled to said distributed control switching matrix, for producing control signals in response to signals representing interconnection requests received from said data ports and voice ports; said distributed control switching controller including a port signalling concentrator for establishing connection between data ports and said distributed control switching controller independent of said distributed control switching matrix; and said distributed control switching matrix being responsive to said control signals for establishing connections among computers.

10. An integrated communications system as in claim 9 wherein said distributed control switching controller includes a control adaptor for establishing connection between two data ports.

* * * * *